United States Patent [19]

Araki et al.

[11] Patent Number: 5,474,736
[45] Date of Patent: Dec. 12, 1995

[54] METHODS FOR MANUFACTURING TUBES FILLED WITH POWDERY AND GRANULAR SUBSTANCES

[75] Inventors: Nobuo Araki, Tokyo; Takeji Kagami, Hikari; Toru Ono, Tokyo; Iwao Yamada, Tokyo; Seiji Hashimoto, Tokyo, all of Japan

[73] Assignee: Nippon Steel Welding Products & Engineering Co., Ltd., Tokyo, Japan

[21] Appl. No.: 125,400

[22] Filed: Sep. 23, 1993

[30] Foreign Application Priority Data

| | | | |
|---|---|---|---|
| Sep. 25, 1992 | [JP] | Japan | 4-256642 |
| Dec. 28, 1992 | [JP] | Japan | 4-348554 |
| Feb. 25, 1993 | [JP] | Japan | 5-036758 |
| Mar. 12, 1993 | [JP] | Japan | 5-052641 |
| Apr. 28, 1993 | [JP] | Japan | 5-103273 |
| May 7, 1993 | [JP] | Japan | 5-106901 |

[51] Int. Cl.$^6$ .................................................. B22F 5/00
[52] U.S. Cl. ........................... 419/3; 419/8; 419/67; 228/158
[58] Field of Search ....................... 419/8, 67, 3; 228/158

[56] References Cited

U.S. PATENT DOCUMENTS

| | | | |
|---|---|---|---|
| 4,629,110 | 12/1986 | Holmgren | 228/148 |
| 4,632,882 | 12/1986 | Werner et al. | 428/558 |
| 5,192,016 | 3/1993 | Araki et al. | 228/147 |

FOREIGN PATENT DOCUMENTS

| | | |
|---|---|---|
| 0003370 | 8/1979 | European Pat. Off. . |
| 0158691 | 10/1985 | European Pat. Off. . |
| 0177468 | 4/1986 | European Pat. Off. . |
| 0489167 | 6/1992 | European Pat. Off. . |
| 54-109040 | 8/1979 | Japan . |
| 60-234794 | 11/1985 | Japan . |
| 60-234792 | 11/1985 | Japan . |
| 63-5897 | 1/1988 | Japan . |
| 3-207598 | 9/1991 | Japan . |

OTHER PUBLICATIONS

Patent Abstracts of Japan, vol. 10, No. 100 (M-470) Apr. 16, 1986.

Patent Abstracts of Japan, vol. 11, No. 39 (M-559) Feb. 5, 1987.

*Primary Examiner*—Donald P. Walsh
*Assistant Examiner*—Anthony R. Chi
*Attorney, Agent, or Firm*—Wenderoth, Lind & Ponack

[57] ABSTRACT

A method for manufacturing tubes filled with powdery and/or granular substances comprising the steps of forming a metal strip into a tube, feeding powdery and/or granular substances into the tube being formed as a core, joining together the edges of the tube filled with the core of the powdery and/or granular substances by high-frequency welding, and reducing the diameter of the welded tube filled with the core of the powdery and/or granular substances. At least the top layer of the core in the tube is composed of powdery and/or granular substances having low enough magnetic susceptibility to remain unattracted to the magnetized tube edges that is determined based on the welding heat input.

19 Claims, 15 Drawing Sheets

FIG. 6
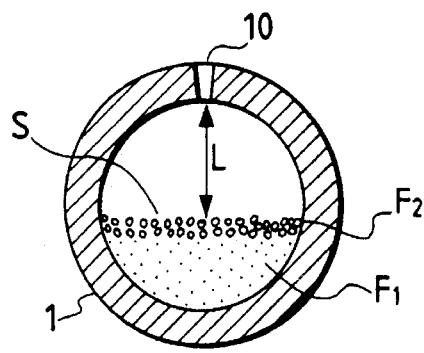
FIG. 7
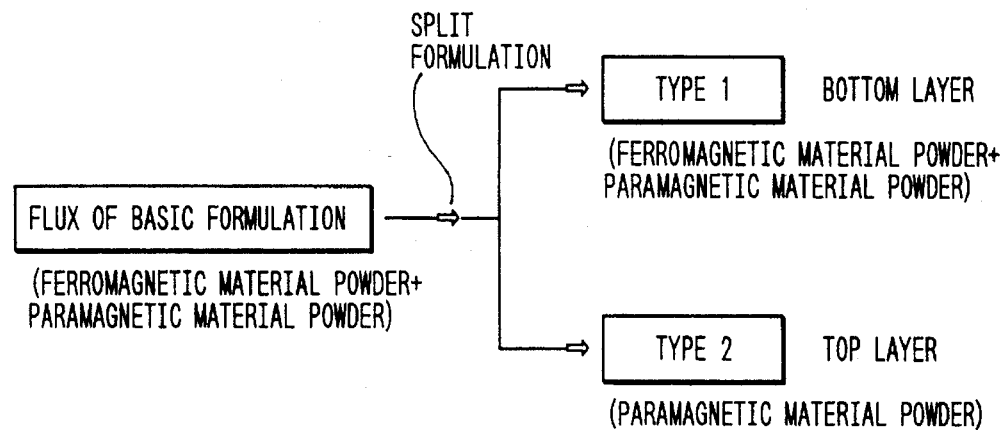
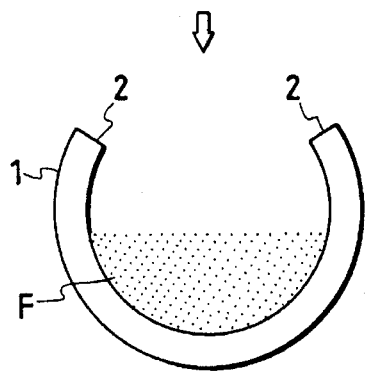
[FILLED WITH FLUX OF BASIC FORMULATION]
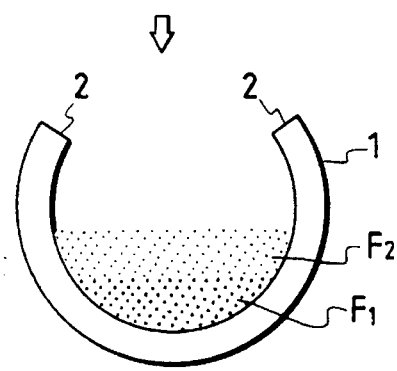
[FILLED WITH FLUX OF SPLIT FORMULATION]

$$\begin{bmatrix} \text{MIXING RATIO}\cdots Na:Nb:Nc:Nd:Ne=Na1:Nb1:Nc1:Nd1:Ne1=Na2:Nb2:Nc2:Nd2:Ne2 \\ \text{PERCENT CONTENT}\cdots Nx1=(Nx\cdot 100)/n1 \\ \qquad Na1=\{Na\cdot 100\cdot(n1-Nx)\}/\{n1\cdot(100-Nx)\} \quad (Nb1, Nc1, \cdots \text{THE SAME}) \\ \qquad Na2=(Na\cdot 100)/(100-Nx) \quad\quad\quad\quad\quad (Nb2, Nc2, \cdots \text{THE SAME}) \end{bmatrix}$$

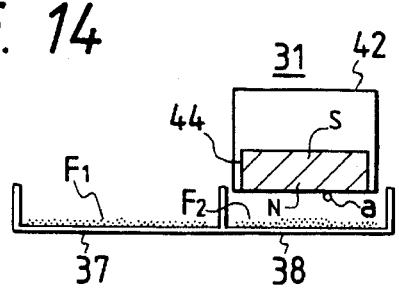
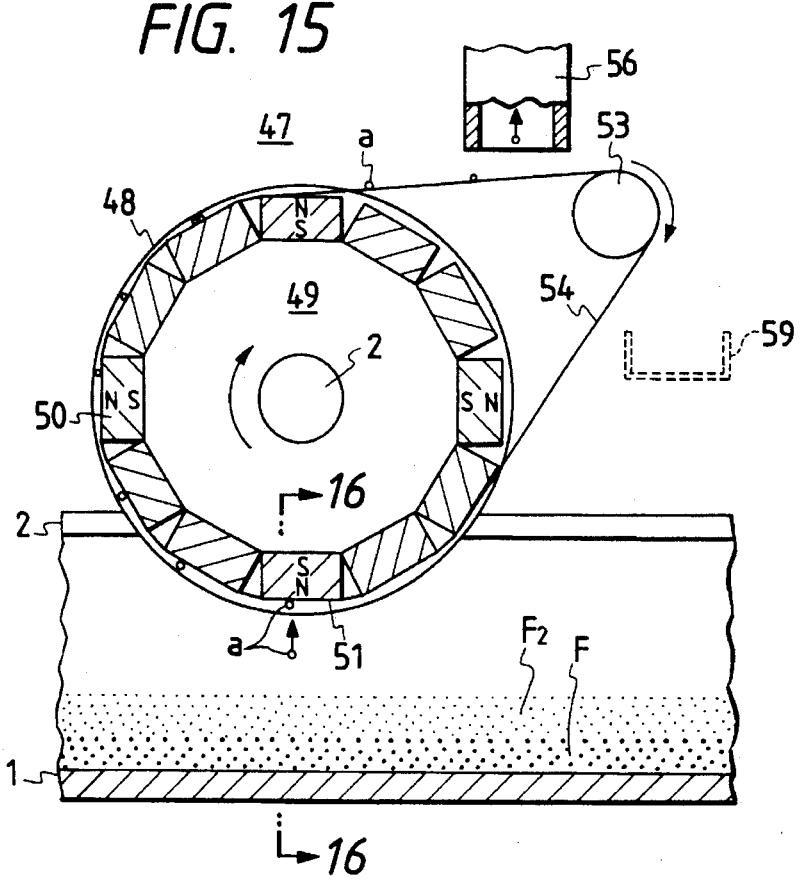
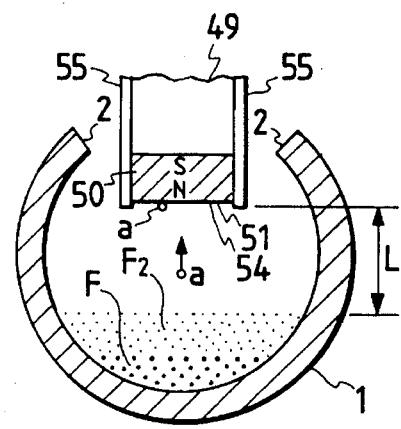

FIG. 35
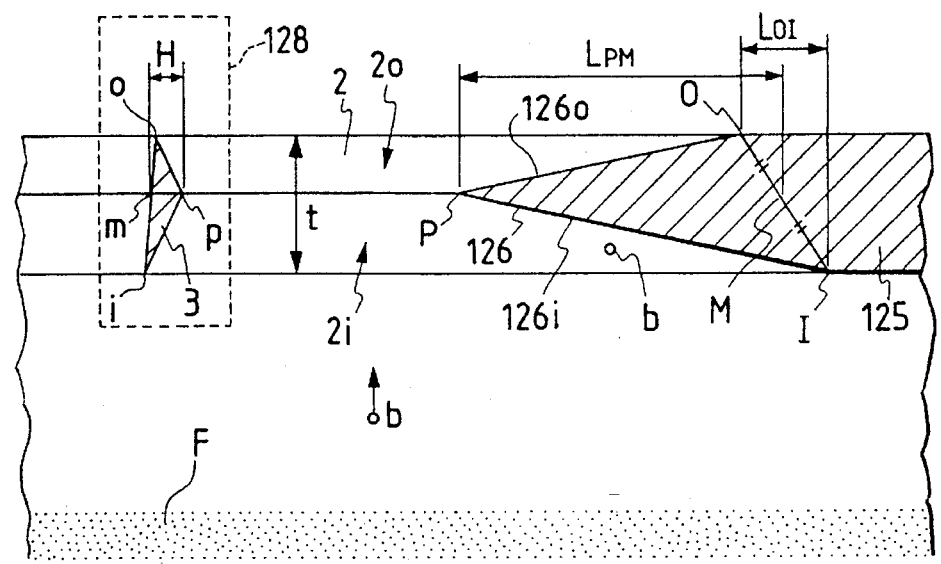
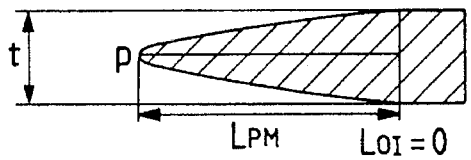
FIG. 36(a)
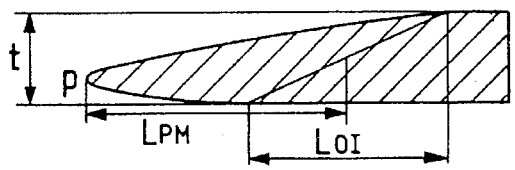
FIG. 36(b)
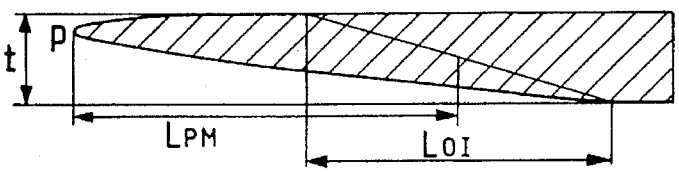
FIG. 36(c)
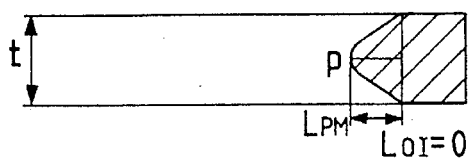
FIG. 36(d)

FIG. 37
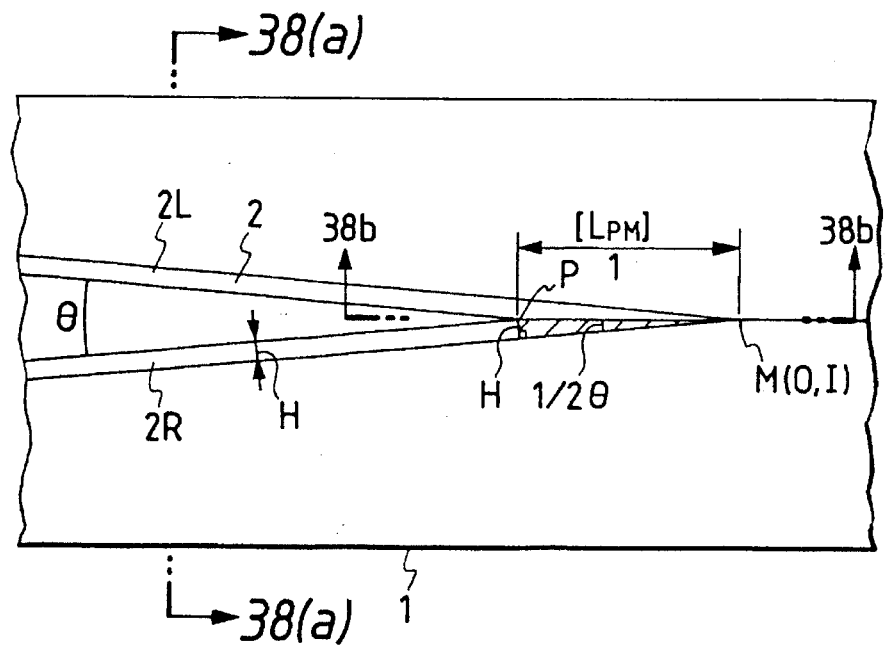
FIG. 38(a)
FIG. 38(b)
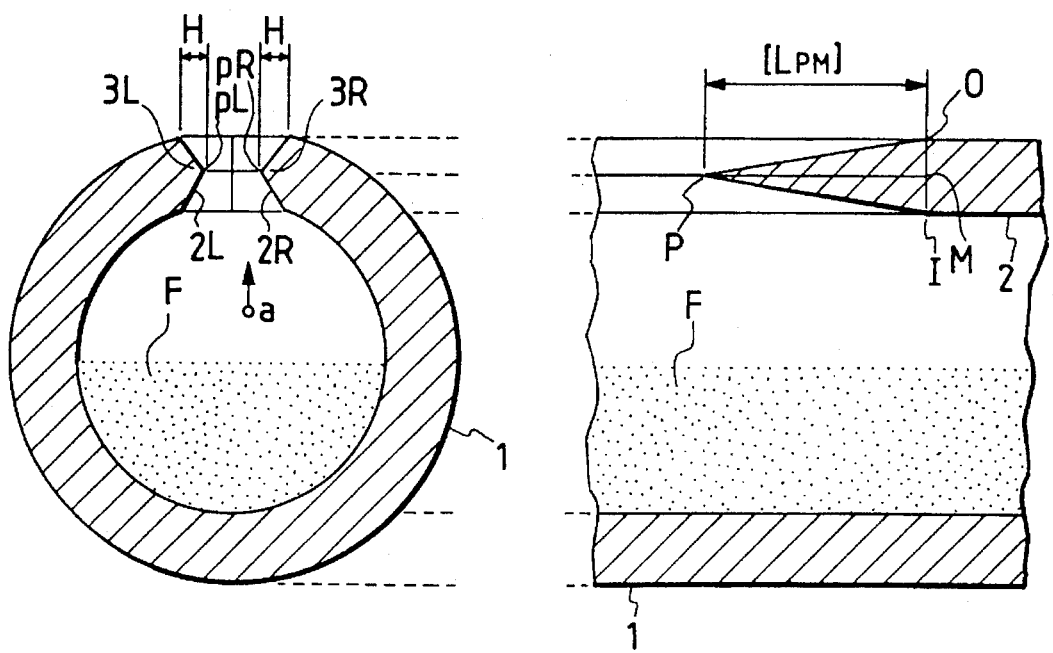

METHODS FOR MANUFACTURING TUBES FILLED WITH POWDERY AND GRANULAR SUBSTANCES

BACKGROUND

This invention relates to methods for manufacturing tubes of carbon steels, stainless steels, copper alloys, aluminum alloys and other metals filled with a core of powdery and/or granular substances.

One example of tubes of this type is flux-cored tubular welding electrode wires. Tubular cored electrodes are manufactured by forming a slit steel strip first into a U-shaped section, into which is filled a specified amount of formulated flux supplied from a flux feeder, and then into an O-shaped section. A flux-cored tube made by welding together the edges of the O-shaped section is then drawn through dies to reduce its diameter and passed through an annealing process if necessary. The flux-cored tubular electrode thus prepared is further reduced to the desired diameter and finished as a coiled product.

Welding in the above process is commonly performed by high-frequency welding processes such as high-frequency induction and resistance welding. In these welding processes, the edges of the almost O-shaped section are heated to the melting temperature by applying a high-frequency current and pressed together by a pair of squeeze rolls to produce coalescence.

Cracks sometimes occur in flux-cored tubular electrode wires when their diameter is reduced in the post-welding rolling or drawing operations. This cracking is explained as follows: During welding, some of the oxide and silicate in the flux adheres to the edges of the open tube. At the welding spot, to be more specific, the magnetic field formed by the welding current turns the edges of the open tube into magnetic poles that attract the strongly magnetic or ferromagnetic ingredients of the flux together with some of the weakly magnetic or paramagnetic ones. The attracted substances at the edges fuse into the weld as unwanted inclusions that result in weld defects which, in turn, cause the cracking in the diameter reduction operations. The cracks in the flux-cored tubular electrode wires impair weld quality and welding efficiency.

Usually, compounds of various ingredients selected to meet the intended applications of cored tubes are filled, either as such or in granulated form, in the semi-finished open tubes. The flux-cores of tubular electrode wires, for example, comprise slag formers such as rutile powder and magnesia clinker, arc stabilizers such as sodium silicate and potassium titanate, and deoxidizers and alloying agents such as low-carbon ferrosilicon, ferrosilicon manganese and aluminum magnesium. Iron powder, iron oxides and other ferromagnetic substances are sometimes added for the increase of deposition speed, adjustment of flux packing density, and improvement of welding efficiency. In addition, the flux-cores usually contain not less than 5% iron-bearing ingredients in total, with fine particles ranging from 32-mesh (0.5 mm) to dust accounting for at least 50%. All particles of granulated fluxes and the particles of non-granulated ferroalloys, iron powder and iron oxide contain ferromagnetic iron-bearing ingredients. When preparing or powdering non-iron-bearing materials, contamination with iron powder, iron oxides or other ferromagnetic substances is sometimes unavoidable. Therefore, there is an adequate risk that the magnetized edges of almost closed tubes attract particles of the filled fluxes, not only when they contain iron powder, iron oxides and other ferromagnetic substances but also when they are made of only paramagnetic substances. Particularly, particles whose size is smaller than that at equilibrium where a magnetic attraction working on particles balances with the resisting gravity are high susceptible to the attraction. Furthermore, a certain extent of ingredients segregation is unavoidable in granulated fluxes. Then, the particle size at equilibrium becomes larger when iron segregation occurs concentrically in fine particles, thereby dangerously increasing the number of fine particles susceptible to magnetic attraction and the attraction-to-gravity ratio.

The "Method for Manufacturing Filler Wire" disclosed in Japanese Provisional Patent Publication No. 234792 of 1985 offers a solution for the above problem. The filler wire according to this invention has a core consisting of an upper layer of nonmagnetic material and a lower layer of ferromagnetic or ferritic material, with the upper layer keeping the lower layer from being attracted to the magnetized edges of the almost closed tube. However, the upper layer of only nonmagnetic substances and the lower layer of only ferromagnetic (or ferritic) substances are completely separated from each other. When subjected to stress-relief annealing or dehydrogenating heat treatment during the diameter reduction process, the ferromagnetic substances (such as iron powder) form a coherent mass as a result of sintering. This leads to the localized thinning, and then cracking, of the tube wall during diameter reduction. The "Composite Electrode Wire" disclosed in Japanese Provisional Patent Publication No. 234794 of 1985 has a powdery core of substantially nonmagnetic substances whose specific magnetic permeability is not higher than 1.10 so that the core materials remain unattracted to the magnetized edges of almost closed tube. However, the materials of this core contain no ferromagnetic powder at all. The "Method of Manufacturing Tubes Filled with Powders" disclosed in Japanese Provisional Patent Publication No. 109040 of 1979 leaves a large enough clearance between the edges of an almost closed tube to be welded and the surface of a powdery core contained therein to keep even the stirred powder away from the edges, instead of filling the tube to its utmost limit. However, this method has little effect on the stirring of the powder containing even a very small quantity of ferromagnetic ingredients. The "Method of Manufacturing Composite Tubes" disclosed in Japanese Provisional Patent Publication No. 5897 of 1988 removes finer ingredients than 48-mesh, which can be more readily stirred up than the coarser ones, from a powder fed into the almost closed tube to prevent the adhesion of the finer ingredients to the edges of the tube to be welded. The "Method of Manufacturing Wires Filled with Powders" disclosed in Japanese Provisional Patent Publication No. 207598 of 1991 feeds a Granulated powder of substantially nonmagnetic substances into the almost closed tube to prevent the stirring of ferromagnetic ingredients to the edges of the tube to be welded. Though the latter two inventions brought about some improvement, unnegligible quantities of powders have continued to adhere to the edges of almost closed tubes to be welded.

Despite the improvements brought about by the above inventions, cracks have continued to occur in the tube diameter reduction operations, considerably impairing the product yield. Once formed, even minute cracks develop along the length of tubes as their diameter becomes smaller, which eventually grown into unnegligible lengths on finished tubes.

SUMMARY

The object of this invention is to provide methods for manufacturing crack-free tubes filled with powdery and granular substances by making sound welded seams.

The methods of this invention, which comprises the basic steps of forming a metal strip into a tubular section, feeding a powdery or granular core material into the section being formed, joining the edges of the core-filled section by high-frequency welding, and reducing the diameter of the welded cored tube, are offered in the following versions:

The first version has at least the top layer of the powdery or granular core in the tube made of powdery or granular substances having low enough magnetic susceptibillties remain unattracted to the magnetized edges of almost closed tubes that are dependent upon the heat input applied in welding.

The second version chooses powdery or granular substances having low enough magnetic susceptibilities and large enough particle masses to remain unattracted to the magnetized edges of almost closed tubes that are dependent upon the heat input applied in welding. A given amount of clearance is left between the top layer of the powdery or granular core consisting of the chosen substances and the edges of the tube to be welded.

The third version feeds a mixture of ferromagnetic and paramagnetic substances formulated to given basic proportions into tubes as the core thereof. The mixture may be split into at least a first portion consisting of a mixture of ferromagnetic and paramagnetic substances and a second portion consisting of only paramagnetic substances. The first portion is fed to form the bottom layer and the second portion as the top layer.

The fourth version removes the magnetic particles from the surface or sub-surface of the filled core by magnetic attraction before both edges of almost closed tubes are joined together by high-frequency welding. The magnetic particles are those which exist either inside or at the surface of the core. Their removal by magnetic attraction may be effected either before or after the core materials are fed into almost closed tubes. To achieve better results, it is preferable to remove the magnetically attracted particles further by vacuum suction.

The fifth version relates to tubes having a wall thickness of not greater than 5 mm and an outside diameter of not larger than 50 mm whose edges forming a groove flaring upward and downward from the center of the wall thickness are joined together by butt welding.

All versions of this invention substantially eliminate the cracking of tubes due to the unwanted adhesion of powdery or granular core materials to the magnetized edges of almost closed tubes, thereby assuring the manufacture of good-quality cored tubular products with high product yield.

DRAWINGS

FIG. 1 graphically shows a range of appropriate heat input varying with welding speed.

FIG. 2 graphically shows an allowable range of the magnetic susceptibility of the powdery or granular core materials varying with welding heat input.

FIG. 3 graphically shows a range of the desirable particle size of the powdery or granular core materials varying with welding heat input.

FIG. 4 shows an embodiment of apparatus for manufacturing cored tubes according to this invention or, more specifically, the principal part of an apparatus for manufacturing flux-cored welding electrode wires.

FIG. 5 graphically shows a range of the allowable particle mass of the powdery or granular core materials varying with welding heat input.

FIG. 6 is an enlarged cross-sectional view showing the inside of an almost closed tube between the work coil and squeeze rolls.

FIG. 7 shows the relationship between the flux of a basic formulation and the split fluxes of two formulations.

FIG. 14 is a cross-sectional view showing another embodiment of the first magnetic attracting device.

FIG. 15 is a cross-sectional view of a second magnetic attracting device.

FIG. 16 is a cross-sectional view taken along the line 16—16 of FIG. 15.

FIG. 35 shows the profile of a seam end.

FIGS. 36(a)–36(d) show shows concrete examples of seam ends.

FIG. 37 is a top view of an almost closed tube at the welding spot.

FIG. 38 shows cross-sectional views taken along the lines 38a—38a and 38b—38b of FIG. 37 at (a) and (b).

Figure 39:
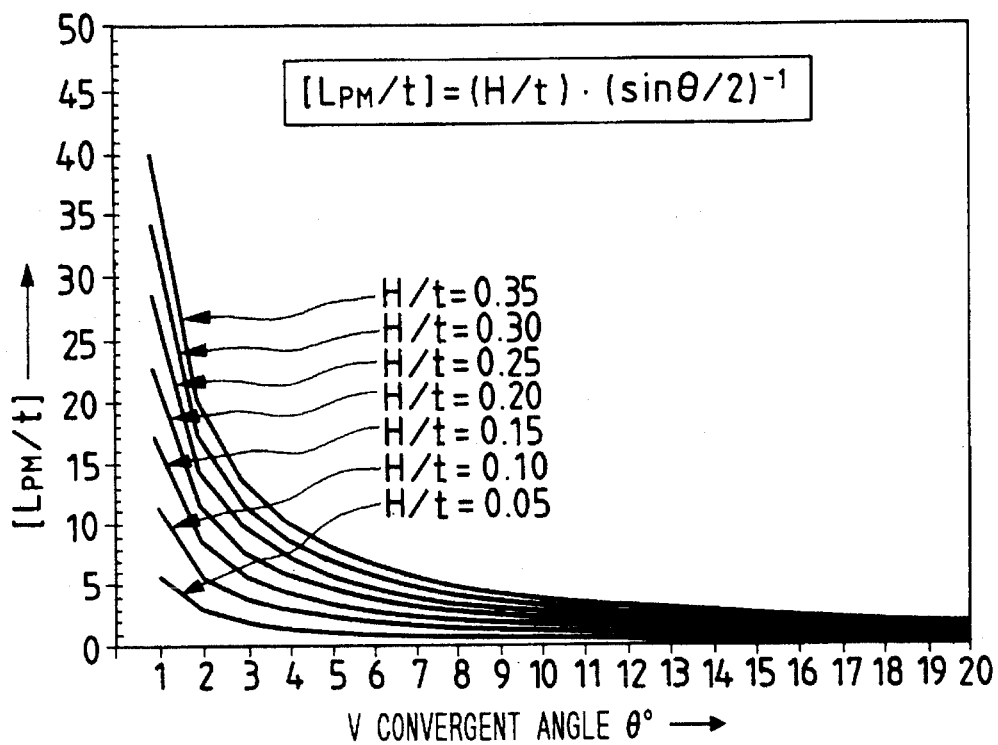

FIG. 39 shows the relationship between the theoretical value $L_{PM}/t$ and the convergent angle θ.

Figure 40:
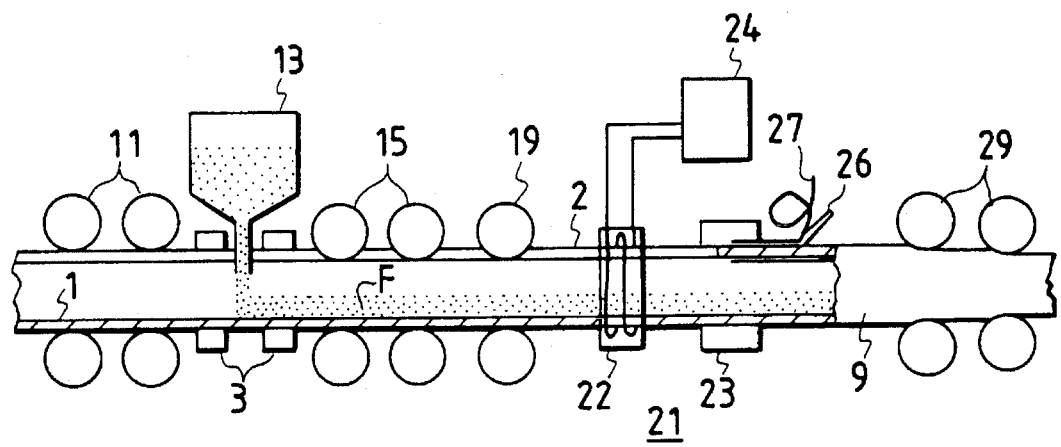

FIG. 40 shows the principal part of an apparatus for manufacturing flux-cored welding electrode wires.

DESCRIPTION

The First Preferred Embodiment

The inventors reconfirmed that the cracks occurring during the tube-diameter reduction process is a weld defect resulting from the adhesion of powdery core materials to the magnetized edges of almost closed tubes. Simple granulation of powdery materials into larger-sized particles and exclusive use of only substantially paramagnetic material powders proved to have little preventive effect. Taking notice of the magnetic properties of the powdery and granular core materials, the inventors discovered that the powdery and granular paramagnetic substances with magnetic susceptibilities under a certain limit defined by the welding heat input do not adhere to the magnetized edges, causing no cracking afterward.

This invention is based on the above knowledge. A method of manufacturing tubes filled with powdery and granular substances is characterized in that at least the top layer of the core in tubular products is made up of powdery and/or granular substances with low enough magnetic susceptibilities to remain unattracted to the magnetized edges of almost closed tubes that are dependent upon the welding heat input. In this preferred embodiment, powdery and/or granular substances having the following magnetic susceptibility $X_g$ is fed into the section being formed to form at least the top layer of the core therein:

$$X_g \leq (2.00 + 246 P^{-0.89}) \cdot 10^{-4} [\text{emu/g}]$$

where P=welding heat input [kVA]

It is preferable that the core materials fed into tubes are pre-granulated and have a particle size d not smaller than $0.02 P^{0.6}$ [mm] ($d \geq 0.02 P^{0.6}$ [mm]).

In this preferred embodiment, the magnetic susceptibility of the core material $X_g$ is kept low as described above according to the heat input P of high-frequency welding ($E_P I_P$ [kVA]) and the core materials are pre-granulated. Therefore, the influence of the magnetic field built up by the welding current $I_P$ is substantially negligible.

The magnetic susceptibility $X_g$ used in this preferred embodiment can be expressed by the following equation, in which the mass of the core material is [g], magnetic moment is μ [G·cm³], and external magnetic field H[$O_e$(=G)]:

$$X_g = \mu/aH [\text{cm}^3 \cdot \text{g}^{-1}]([\text{cm}^3 \text{g}^{-1}] = [\text{emu/g}])$$

Here, [cm³·g⁻¹] is expressed as [emu/g] according to the conventional practice.

Figure 1:
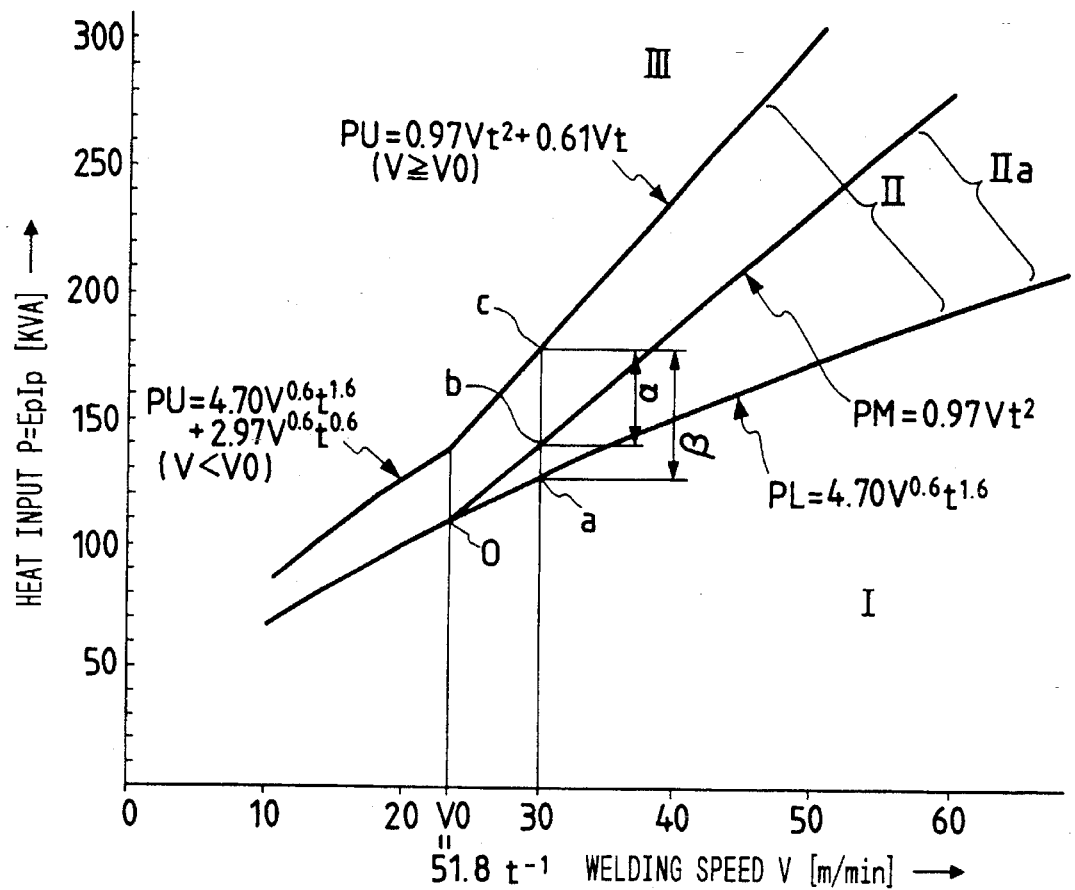

In this preferred embodiment, heat input P is the heat $E_P I_P$ (kVA) from a welding machine, and the appropriate heat input varies with welding speed V, strip thickness t and other factors. FIG. 1 shows a range of the appropriate heat input varying with welding speed V (m/min). In FIG. 1, cold weld cracking occurs in region I below curve $P_L$. Curve $P_L$ can be approximated as $P_L = 4.70 V^{0.6} t^{1.6}$. Spatters larger than the inside diameter of the finished tube occurs in region III above curve $P_U$. Curve $P_L$ can be approximated as $P_U = 4.70 V^{0.6} t^{1.6} (=P_L) + 2.97 V^{0.6} t^{1.6}$ in a region where welding speed V is not higher than the critical welding speed $V_O$ (at point O where curve $P_L$ intersects straight line $P_M$), and as $P_U = 0.97 Vt^2 (=P_M) + 0.61 Vt$ where welding speed V exceeds the critical welding speed $V_O$. In region II between curves $P_L$ and $P_U$, no cold weld cracking and spatters larger than the inside diameter of the finished tube that can cause cracking or breaking in the subsequent drawing process occur. Straight line $P_M$, which can be approximated as $P_M = 0.97 Vt^2$, shows the minimum heat input to cause spattering. No cold weld cracking and spattering occur in region IIa between curve $P_L$ and straight line $P_M$. The critical welding speed $V_O$ is the speed beyond which region IIa disappears.

Productivity increases with an increase in welding speed which, however, is limited by the feed rate of the core material, capacities of the tubing and subsequent rolling mills, and other factors. While smaller heat input permits greater energy saving, it is preferable to select such heat input within the range described before as will leave adequate room to accommodate variations in supply voltage and other tubing conditions.

Various kinds of core material powders are chosen to meet the intended applications of finished tubular products and fed, either as such or in granulated forms, into almost closed tubes. The core materials for flux-cored welding electrode wires, for example, comprise slag formers such as rutile powder and magnesia clinker, arc stabilizers such as sodium silicate and potassium titanate, and deoxidizers and alloying agents of such paramagnetic compounds as low-carbon ferrosilicon, ferrosilicon manganese and aluminum magnesium. Iron powder and other ferromagnetic ingredients are sometimes added for the increase of deposition speed, adjustment of flux packing density, and improvement of welding efficiency. The magnetic field built up by the welding current at the welding spot magnetizes the edges of almost closed tubes. The magnetized edges can attract the ferromagnetic ingredients in the core materials. To prevent such attraction, attempts have been made to eliminate iron powder, iron oxides and other ferromagnetic ingredients and feed only paramagnetic substances (Japanese Provisional Patent Publication Nos. 234794 of 1985 and 2097598 of 1991). Though proved to be effective in the prevention of some cracking, these attempts have not succeeded in offering perfectly satisfactory solutions. The failure is due to the strength of the magnetic field built up by the heat input P ($P_L < P < P_U$) of high-frequency welding that is so great that even paramagnetic ingredients with specific magnetic permeabilities of not higher than 1.10 can possibly be attracted to the edges of almost closed tubes.

The inventors empirically discovered that the influence of the magnetic field built up by the heat input P ($P_L < P < P_U$)

of high-frequency welding can be reduced to a substantially negligible level if the magnetic susceptibility $X_g$ of the core materials is limited as expressed below according to the level of the heat input P [kVA]:

$$X_g \leq (2.00 + 246P^{-0.89}) \cdot 10^{-4} \text{ [emu/g]}$$

Here, the magnetic susceptibility of the core materials was determined by the use of a vibrating specimen magnetometer (VSM).

Figure 2:
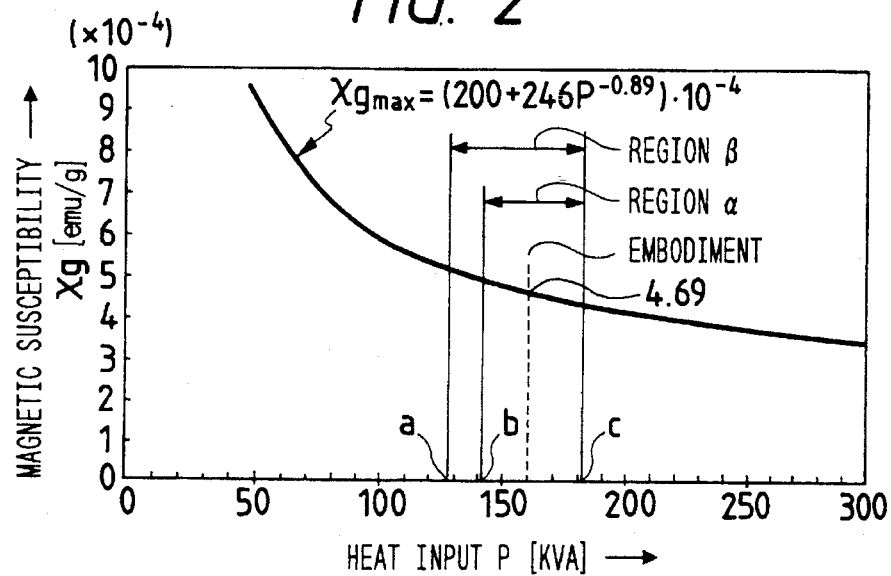

FIG. 2 shows a range of the magnetic susceptibility of the powdery and/or granular core materials varying with heat input P. In FIG. 2, the region above curve $X_{g\ max}$ (expressing the upper limit of the allowable magnetic susceptibility) is a dangerous region in which cracks detrimental to product quality could occur and the region below the same curve is a safe region where no such cracks occur. As is obvious from the figure, the higher the heat input P, the lower the upper limit of the allowable magnetic susceptibility $X_{g\ max}$. This can be explained as follows: As the heat input P increases, more current flows to the edges of an almost closed tube, thus building up a stronger magnetic field therein. This increases the possibility of the core materials in the tube becoming magnetized. To preclude this possibility, therefore, core materials of lower magnetic susceptibility must be used when welding is performed with greater heat input.

Though there is no need to restrict the lower limit of the magnetic susceptibility $X_g$, $|X_g|$ is always greater than 0 ($|X_g|>0$) as all core materials have their own magnetic susceptibilities.

Limiting the magnetic susceptibility $X_g$ of core materials according to heat input P has proved an effective means to prevent the cracking of tubes. The use of coarser core materials adds the effect of weight to withstand the influences from outside. This, when employed together with the limited magnetic susceptibility, has proved to be even more effective in the prevention of cracks. The core materials as-mixed for the flux-cored welding electrode tubes generally contain more than 50% of powders finer than 0.1 mm (approximately 145 meshes). As such finer powders in the upper part of the core layer are apt to stir up when exposed to unfavorable external environments, it is preferable to add the effect of weight by increasing their particle size. Increasing the particle size of ingredient powders themselves tends to result in breaking in the subsequent diameter-reduction process while lowering the efficiency of welding with finished flux-cored welding electrode wires. Therefore, the desired addition of weight effect is achieved by granulating the powdery core materials. When granulated with paramagnetic substances, iron powder and other ferromagnetic substances, which themselves are susceptible to the influence of the magnetic field, become less susceptible to stirring and attraction because of the increased weight of the individual particles.

When high iron contents are required, it is preferable to add ferromagnetic iron alloys (such as ferrosilicon, ferromanganese and ferrotitanium) rather than iron powder per se. Addition of such ferromagnetic iron alloys lowers the magnetic susceptibility of the entire core materials. If at least the top layer of the core materials is composed of such ferromagnetic substances, even core materials of high iron contents remain unattracted to the magnetized edges of almost closed tubes.

Figure 3:
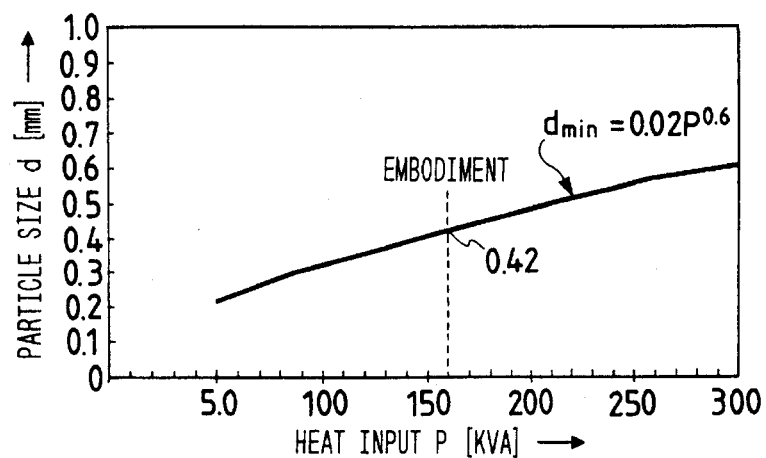

The particle size d of the granulated core material, which varies with heat input P, is preferably $d \geq 0.2P^{0.6}$ [mm] (>90 wt %). FIG. 3 shows a curve representing the lower limit of the particle size that is expressed as $d_{min} = 0.02P^{0.6}$. The region above this curve is a defect-free region where no crack occurs. Obviously, increasing the particle size is conducive to coping with the strengthening of the magnetic field resulting from an increase in the heat input P.

Core material powders are granulated by rolling, extruding, compressing or other known granulating methods and classified by sieving or other known methods. For example, a solution of sodium silicate or that of potassium silicate or a mixture thereof is added, as a binder, to a mixture of ingredient powders weighed to given proportions. The wet mixture is then granulated by a pan type granulator. The resulting granules are dried and classified by sieving to leave only those in the desired size range.

Though the upper limit of particle size d is not specifically restricted, d is not more than $5D_1$ ($d \leq 5D_1$ where $D_1$ is the inside diameter of the finished tube), or preferably not more than $2D_1$ ($d \leq 2D_1$). Larger granules tend to cause uneven core distribution throughout the length of the tube in the diameter-reduction process, which often leads to nonuniform wall thickness and eventual breaking.

When the heat input P of the welder is increased by increasing the high-frequency current passing through the work coil, the strength of the magnetic field increases to exert a greater influence on the core material in the tube.

This preferred embodiment, as described above, prevents the stirring of the core materials under the influence of the magnetic field by restricting the upper limit of the magnetic susceptibility $X_g$ varying with heat input P to within the paramagnetic range or adding the effect of weight by granulating the core material. Therefore, this preferred embodiment is substantially free from the cracks resulting from the adhesion of the core materials to the magnetized edges of almost closed tubes.

Such limitation may not necessarily be applied to the entirety of the core materials. The desired effect is attainable if at least the top layer of the core materials is within the desired limit because the top layer shields the underlying layer from the influence of the magnetic field. Therefore, the materials making up the bottom layer may be either granulated or non-granulated and either ferromagnetic or paramagnetic so long as the shielding effect of the top layer remains unimpaired.

EXAMPLE

Figure 4:
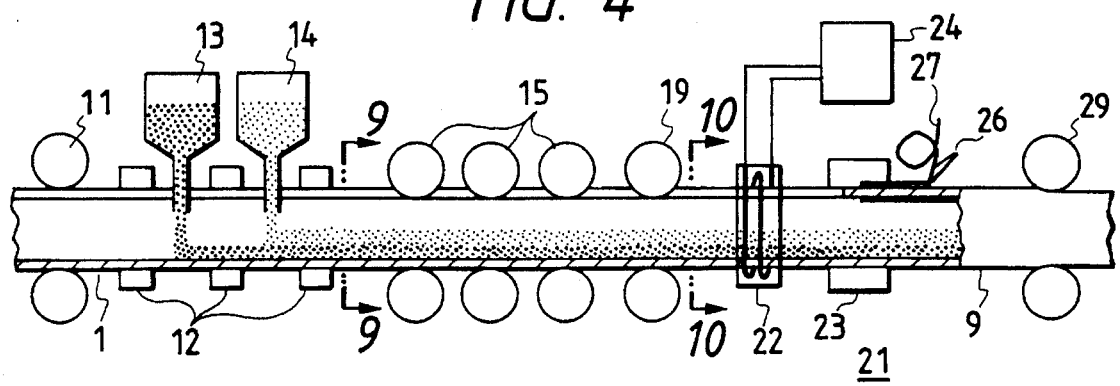

An example of the manufacture of flux-cored welding electrode wire is described below. FIG. 4 shows the principal part of an apparatus for manufacturing flux-cored welding electrode wires.

Forming rolls 11, side rolls 12 and flux feeders 13 and 14 are disposed along the pass line of an open tube 1, as shown in FIG. 4. Preforming rolls (not shown) are on the upstream of the forming rolls 11. The flux feeder 13 first feeds flux $F_1$ into the open tube 1 being formed to form the bottom layer of the core therein. Then, the flux feeder 14 feeds flux $F_2$ to form the top layer thereon. The open tube 1 filled with the fluxes $F_1$ and $F_2$ passes through the fin-pass rolls 15 and seam-guide rolls 19 into the welding zone. A high-frequency welder 21 comprises a work coil 22 and squeeze rolls 23. A power supply 24 supplies a high-frequency welding current to the work coil 22. With the outside flash 27 removed by a cutting tool 26, the welded tube 9 is rolled through rolling rolls 29. While being annealed, the tube 9 is further reduced to a finished product with an outside diameter of 1.0 to 2.0 mm through rolling and drawing lines (both not shown). If the flux is paramagnetic, the core may be fed in one layer, instead of two, which permits also reducing the number of flux feeders to one.

Steel strips having a width w of 30 to 150 mm and a thickness t of 1 to 5 mm were formed into tubes having an outside diameter $D_O$ of 10 to 50 mm by high-frequency welding under the following conditions:

Frequency of high-frequency current: f=300 to 800 kHz
Heat input ($E_P I_P$): P=50 to 500 kVA
Distance between work coil and welding point: l=10 to 100 mm
Apex angle (angle of convergence V): θ=3 to 15 degrees Welding (or tubing) was carried out at a speed V of 10 to 200 m per minute.

The cracks occurred on the flux-cored welding electrode wires manufactured by the above apparatus are described below.

Steel strip 2.2 mm thick and 65.5 mm wide (according to JIS G 3131 SPHC and containing 0.05% carbon) was formed into tubes having an outside diameter of 22.4 mm and an inside diameter of 18.0 mm. The open tubes 10 to 20% filled with flux were continuously butt-welded. The frequency of the current supplied to the work coil was 540 kHz and the welding speed V was 30 m per minute. The distance between the work coil and the welding spot was 25 mm and the apex angle was 7 degrees. The outside diameter of the welded tubes was reduced through rolling rolls from 22.4 mm to 3.2 mm, with annealing applied once midway. The tubes were annealed, plated, coiled up, and then drawn to the finished products having an outside diameter of 1.2 mm and an inside diameter of 0.6 mm. The obtained products were inspected for the presence of cracks.

Now let us determine the range of the appropriate heat input. Because the welding speed V was 30 m per minute and strip thickness t was 2.2 mm, $$\text{Critical welding speed } V_0 = 51.8 t^{-1}$$
$$= 23.5 \text{ m/min } (<V=30 \text{ m/min})$$

Therefore, the lower and upper limits of the appropriate heat input are expressed as:

$$\text{Lower limit } P_L = 4.70 V^{0.6} t^{1.6}$$
$$= 128 \text{ kVA} \ldots \text{(point a in FIGS. 1 and 2)}$$
$$\text{Upper limit } P_U = 0.97 V t^2 + 0.61 V t$$
$$= 181 \text{ kVA} \ldots \text{(point c in FIGS. 1 and 2)}$$

Thus, the range of the appropriate heat input P is between 128 and 181 kVA (region β in FIGS. 1 and 2). Because $P_M = 0.97 V t^2 = 141$ kVA (point b in FIGS. 1 and 2), neither cold weld cracking nor spattering was observed with the heat input between $P_L$ and $P_M$ (=128 and 141 kVa). Between $P_M$ and $P_U$ (=141 and 181 kVA, or region d in FIGS. 1 and 2), some spatters were observed but they were not large enough to cause breaking in the final finish-drawing process.

Within this appropriate heat input range, satisfactory high-frequency induction welding is assured so long as the edges to be butt-welded are clean. However, this welding method builds up a strong magnetic field. Turbulence of air in the tube can cause the ferromagnetic or finer ingredients in the core materials to stir up. Therefore, the edges of almost closed tubes reaching the welding spot are not always clean being contaminated either before or during forming. Therefore, the contaminants must be squeezed out from the edge fused under the heat from the work coil to both outside and inside of the tube. The edges heated to higher temperatures facilitate the squeeze-out of the contaminants. Therefore, the edges are preferably heated to the highest temperature permissible under the specified welding conditions.

In this example, butt welding was carried out with a heat input P of 160 kVA.

Table 1 shows the magnetic susceptibilities of the flux ingredients used. Fluxes $F_1$ to $F_{10}$ shown in Table 2 were prepared by mixing various proportions of the ingredients shown in Table 1, with and without granulation. granulation was carried out on a pan-type granulator, using water glass as the binder. The dried granules were classified by sieving to leave those of the desired size.

When welding heat input P is 160 kVA, the allowable magnetic susceptibility of the flux $X_g$ is expressed as:

$$X_g \leq (2.00 + 246 P^{-0.89}) \cdot 10^{-4} = 4.69 \times 10^{-4} \text{ [emu/g]}$$

The magnetic susceptibility $X_g$ of the granulated fluxes was adjusted by increasing or decreasing the contents of ferromanganese having a magnetic susceptibility $X_g > 4.69 \times 10^{-4}$ cm [emu/g] ($f_7$) and iron powder ($f_{10}$), or without adding them at all. On the other hand, the highest magnetic susceptibility found among the ingredients was chosen to represent the magnetic susceptibility $X_g$ of the non-granulated fluxes.

The preferable range of particle size d is expressed as:

$$d > 0.02 P^{0.6} = 0.42 \text{ [mm]}$$

TABLE 1

| Material Powder | | Magnetic Susceptibility $X_g$ ×$10^{-4}$ (emu/g) |
|---|---|---|
| $f_1$ | Rutile | 1.12 |
| $f_2$ | Silica sand | 1.30 |
| $f_3$ | Zirconium silicate | 0.69 |
| $f_4$ | Potassium titanate | 0.73 |
| $f_5$ | Ferrosilicon manganese | 2.10 |
| $f_6$ | Ferrosilicon | 4.48 |
| $f_7$ | Ferromanganese | 6.55 |
| $f_8$ | Metal manganese | 0.55 |
| $f_9$ | Aluminum magnesium | 1.54 |
| $f_{10}$ | Iron powder | 5300 |

TABLE 2

| Test | | Constituents of Flux (% by weight) | | | | | | | | | Granulated/Not Granulated | Particle Size | | Magnetic Susceptibility $X_g$ [×$10^{-4}$ (emu/g)] | Evaluation of Cracks | Classification of Specimens |
| No. | Flux | $f_1$ | $f_2$ | $f_3$ | $f_4$ | $f_5$ | $f_6$ | $f_7$ | $f_8$ | $f_9$ | $f_{10}$ | | (mm) | (mesh) | | | |
|---|---|---|---|---|---|---|---|---|---|---|---|---|---|---|---|---|---|
| 1 | $F_1$ | 50.2 | 2.7 | 6.0 | 2.4 | 26.1 | — | 8.2 | — | 3.1 | 1.3 | Granulated | 0.5~1.4 | (32~12) | 4.6 | o | This invention |
| 2 | $F_2$ | 50.2 | 2.7 | 6.0 | 2.4 | 27.4 | — | 8.2 | — | 3.1 | — | Granulated | 0.5~1.4 | (32~12) | 2.7 | o | This invention |

TABLE 2-continued

| Test No. | Flux | Constituents of Flux (% by weight) | | | | | | | | | | Granulated/Not Granulated | Particle Size (mm) | Particle Size (mesh) | Magnetic Susceptibility $X_g$ [×10$^{-4}$] (emu/g)] | Evaluation of Cracks | Classification of Specimens |
|---|---|---|---|---|---|---|---|---|---|---|---|---|---|---|---|---|---|
| | | $f_1$ | $f_2$ | $f_3$ | $f_4$ | $f_5$ | $f_6$ | $f_7$ | $f_8$ | $f_9$ | $f_{10}$ | | | | | | |
| 3 | $F_3$ | 50.2 | 2.7 | 6.0 | 2.4 | 27.4 | — | 8.2 | — | 3.1 | — | Granulated | 0.3~1.0 | (48~16) | 2.6 | o | This invention |
| 4 | $F_4$ | 50.2 | 2.7 | 6.0 | 2.4 | 27.4 | — | 8.2 | — | 3.1 | — | Granulated | 0.5 or less | (32~Dust) | 2.9 | o | This invention |
| 5 | $F_5$ | 50.2 | 2.7 | 6.0 | 2.4 | 27.4 | — | — | 8.2 | 3.1 | — | Granulated | 0.5~1.4 | (32~12) | 1.3 | o | This invention |
| 6 | $F_6$ | 50.2 | 2.7 | 6.0 | 2.4 | 27.4 | — | — | 8.2 | 3.1 | — | Granulated | 0.5 or less | (32~Dust) | 1.5 | o | This invention |
| 7 | $F_7$ | 50.2 | 2.7 | 6.0 | 2.4 | 21.9 | — | 8.2 | — | 3.1 | 5.5 | Granulated | 1.0~2.8 | (16~7) | 38.8 | x | Prior art compared |
| 8 | $F_8$ | 50.2 | 2.7 | 6.0 | 2.4 | 26.1 | — | — | 7.2 | 3.1 | 2.3 | Granulated | 0.1~1.0 | (145~16) | 11.5 | x | Prior art compared |
| 9 | $F_9$ | 50.2 | 2.7 | 6.0 | 2.4 | 20.4 | 7.0 | — | 8.2 | 3.1 | — | Not Granulated | 0.3 or less | (48~Dust) | (4.48) | x | Prior art compared |
| 10 | $F_{10}$ | 50.2 | 2.7 | 6.0 | 2.4 | 26.1 | — | 8.2 | — | 3.1 | 1.3 | Not Granulated | 0.3 or less | (48~Dust) | (5300) | x | Prior art compared |
| 11 | Two-layer filling | Top layer: $F_2$ (granulated) + Bottom layer: $F_8$ (granulated) | | | | | | | | | | | | | | o | This invention |
| 12 | Two-layer filling | Top layer: $F_4$ (granulated) + Bottom layer: $F_7$ (granulated) | | | | | | | | | | | | | | o | This invention |
| 13 | Two-layer filling | Top layer: $F_6$ (granulated) + Bottom layer: $F_{10}$ (not granulated) | | | | | | | | | | | | | | o | This invention |

[Note]
1. Magnetic Susceptibility: Actual magnetic susceptibilities are shown for the granulated fluxes, those of the constituents exhibiting the highest values are given for the non-granulated fluxes.
2. Evaluation of Cracks: Evaluated based on the incidence of cracks in 100 km of wire finished to a diameter of 1.2 mm. Wires having no crack was evaluated as good (o) and those having one or more cracks as poor (x).
3. Two-layer Filling: The weight ratio of the top and bottom layers was 50% by weight each.

The entire length of the drawn wires, 1.2 mm in outside diameter and 100 km in length (20 kg spool×37), was subjected to an eddy-current test to determine the presence and position of cracks. When a crack signal was produced, the suspect portion was observed under a magnifying glass to determine the presence of cracks extending along the length of the wires. The completely crack-free wires were evaluated as good (o). Those having one or more cracks were evaluated as poor (x) because any liquid penetrating therethrough during the surface treatment or drawing operation could damage the quality of finished products.

Tests Nos. 1 to 6 and 11 to 13 in Table 2 were made on products according to the first preferred embodiment. The fluxes used in tests Nos. 1 to 6 satisfied the requirement that their magnetic susceptibility $X_g$ should not be higher than 4.69×10$^{-4}$ emu/g. The fluxes forming the top layer (50% by weight of the entire core) in tests Nos. 11 to 13 satisfied the same requirement. The wires evaluated under tests Nos. 1 to 6 and 11 to 13 proved to be crack-free and of good quality, realizing satisfactory welding.

By comparison, tests Nos. 7 to 10 were made on conventional products prepared for the purpose of comparison. While the fluxes used in tests Nos. 7 and 8 had magnetic susceptibilities $X_g$ higher than the allowable upper limit, those used in tests Nos. 9 and 10 were non-granulated and contained higher percentages of fine particles. Particularly, the flux used in test No. 10 had a higher magnetic susceptibility because of the added iron powder ($f_{10}$). With the fluxes stirred up under the influence of the magnetic fields and attracted to the edges of the almost closed tubes, the conventional wires caused cracking and the lowering of the product yield.

According to this preferred embodiment, the magnetic susceptibility of at least the top layer of the core materials is kept below the limit defined according to the welding heat input P. This keeps the core materials in the tube unaffected by the magnetic field resulting from high-frequency welding, thus eliminating the occurrence of cracks substantially completely.

The Second Preferred Embodiment

By paying attention to the magnetic properties and particle mass of the powdery or granular core materials, particularly those in the top layer facing the edges of almost closed tubes, the inventors discovered that the control of their magnetic properties and particle mass is conducive to inhibiting the stirring of the core materials to the edges of almost closed tubes.

The second preferred embodiment chooses powdery or granular core materials having such magnetic properties and particle mass as to prevent the adhesion to the magnetized edges of almost closed tubes based on the welding heat input. The selected materials are fed into almost closed tubes to form at least the top layer of the core therein, with a given clearance left between the top surface of the core and the seam to be welded together.

In this preferred embodiment, the magnetic susceptibility $X_g$, particle mass m, and clearance L are preferably defined as follows:

$$X_g \leq (2.00 + 246 P^{-0.89}) \cdot 10^{-4} \text{ [emu/g]}$$

where
P=welding heat input [kVA]
$m \geq 1.8 \times 10^{-5} \cdot P^{1.8}$ [mg]
$L \geq 5$ [mm]

Of the powdery or granular core materials fed into the tube being formed, at least a portion thereof to form the top layer facing the seam to be welded has the lower magnetic susceptibility $X_g$ defined as above according to the heat input P of high-frequency welding (i.e., $E_P I_P$ [kVA]) and the particle mass larger than the above limit, and is fed while leaving the above clearance between the top surface of the core and the seam to be welded together. Then, the influence of the magnetic field resulting from the heat input P on the core materials is reduced to a substantially negligible level.

The magnetic susceptibility $X_g$ and welding heat input P used in this preferred embodiment are the same as those used in the first preferred embodiment. A combination of the magnetic susceptibility, particle mass and clearance defined by this preferred embodiment prevents the stirring of the core materials to the edges of almost closed tubes. The appropriate ranges of the physical properties (i.e., magnetic susceptibility $X_g$ and particle mass m) of the powdery or granular core materials to prevent their adhesion to the magnetized edges, which vary with the welding heat input P, are determined for individual tubes of different diameters (prior to welding).

Limiting the magnetic susceptibility $X_g$ according to the heat input P is effective for the prevention of tube cracking, as discussed in relation to the first preferred embodiment. This effect proved to be enhanced by the suppression of external influences through the increase of the particle mass of the core materials. To be specific, this enhancement is achieved by keeping the particle mass m varying with the heat input P within the following limit:

$$m \geq 1.8 \times 10^{-5} \cdot P^{1.8} \text{ [mg]}$$

Figure 5:
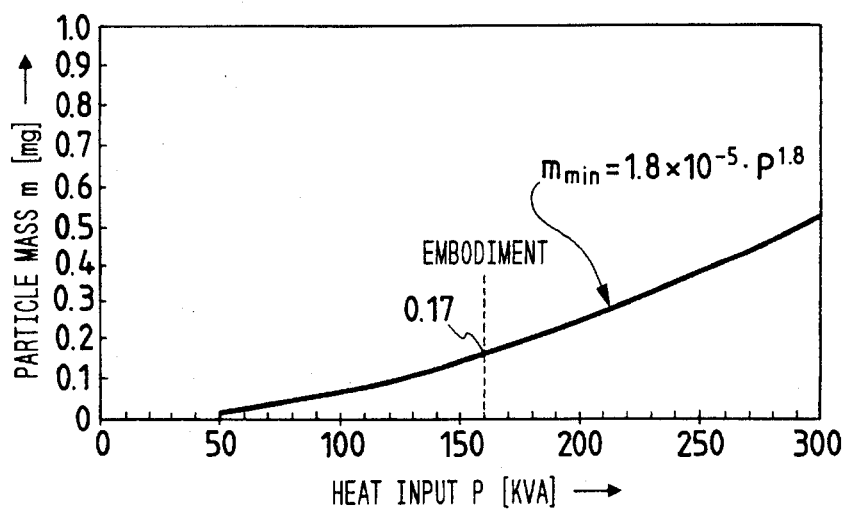

Here, the content of unavoidably mixed particles whose mass is smaller than $1.8 \times 10^{-5} \cdot P^{1.8}$ ($m < 1.8 \times 10^{-5} \cdot P^{1.8}$) is kept 5% by weight maximum. FIG. 5 shows a curve representing the lower limit of the particle mass, $m_{min} = 1.8 \times 10^{-5} \cdot P^{1.8}$. The region above this curve is a defect-free region where no cracking occurs. Obviously, the minimum mass $m_{min}$ increases with an increase in the heat input P. This means that increasing the particle mass is conducive to coping with the strengthening of the magnetic field induced by the increased heat input P.

The core materials within the desired particle mass limit can be obtained, for example, by classifying the granules obtained by granulating the material powders.

Though no upper limit is put on the particle mass m, the particle size d of the core materials is not larger than $5D_1$ ($d \leq 5D_1$), or preferably not larger than $2D_1$ ($d \leq 2D_1$), where $D_1$ is the inside diameter of the finished tube (or the flux-cored electrode wire). Larger granules tend to cause uneven core distribution throughout the length of the tube in the diameter-reduction process, which often leads to non-uniform wall thickness and eventual breaking. Therefore, the upper limit of the particle mass m is preferably the one that corresponds to the upper limit of the particle size d.

This preferred embodiment also defines a safe region where the core materials with the controlled physical properties (i.e., magnetic susceptibility $X_g$ and particle mass m), which at least constitutes the top layer of the core, remain unattracted to the magnetized edges of almost closed tubes. That is, the top layer of the filled core materials having the magnetic susceptibility $X_g$ and particle mass m defined above remains unattracted to the magnetized edges if the following clearance L is left therebetween:

$$L \geq 5 \text{ [mm]}$$

This preferred embodiment takes advantage of the mass effect of the core material particles by defining the upper limit of the magnetic susceptibility $X_g$ in the paramagnetic region by considering the welding heat input P and increasing the mass of the particles. The top layer of the core is thus formed of the materials having the above controlled physical properties, with the clearance L left between the top surface of the core and the seam to be welded together. The low magnetic susceptibility, the mass effect of the particles and the clearance to decrease the effect of the magnetic field, in combination, keep the top layer of the core out of the influence of the magnetic field that might stir up the particles therefrom. With the top layer serving as a weight, the underlying layer remains unaffected by the magnetic field and, therefore, unstirred. Therefore, no limitation is placed on the underlying core materials, which may be either granulated or non-granulated, or magnetic or non-magnetic.

EXAMPLE

An example of the manufacture of flux-cored welding electrode wires is described below.

Steel strips having a width w of 30 too 150 mm and a thickness t of 1.0 to 5.0 mm were formed into tubes having an outside diameter $D_0$ of 10 to 50 mm. The heat input and other welding conditions were the same as in the first preferred embodiment.

The fluxes $F_1$ to $F_{12}$ shown in Table 3 were prepared by mixing the same ingredient powders as those listed in Table 1 for the first preferred embodiment, with and without granulation. The allowable range of the particle mass m was defined as follows:

$$m \geq 1.8 \times 10^{-5} \cdot P^{1.8} = 0.17 \text{ [mg]}$$

FIG. 6 is a cross-sectional view showing the inside of a tube 1 between the work coil 22 (see FIG. 4) and the squeeze rolls 23, with the specified clearance L left between the surface s of the top layer flux $F_2$ and the seam 10 to be welded together.

TABLE 3

| Flux | Constituents of Flux (% by weight) | | | | | | | | | | Granulated or Not Granulated | Mass of Particles (mg) m | Magnetic Susceptibility $X_g$ [$\times 10^{-4}$ (emu/g)] | Classification |
|---|---|---|---|---|---|---|---|---|---|---|---|---|---|---|
| | $f_1$ | $f_2$ | $f_3$ | $f_4$ | $f_5$ | $f_6$ | $f_7$ | $f_8$ | $f_9$ | $f_{10}$ | | | | |
| $F_1$ | 50.2 | 2.7 | 6.0 | 2.4 | 21.9 | — | 8.2 | — | 3.1 | 5.5 | G | 2.43–155.52 | 38.8 | B |
| $F_2$ | 50.2 | 2.7 | 6.0 | 2.4 | 26.1 | — | — | 8.2 | 3.1 | 1.3 | G | 0.002–2.42 | 4.0 | B |
| $F_3$ | 50.2 | 2.7 | 6.0 | 2.4 | 26.1 | — | 8.2 | — | 3.1 | 1.3 | G | 2.42–154.88 | 4.3 | A |
| $F_4$ | 50.2 | 2.7 | 6.0 | 2.4 | 27.4 | — | 8.2 | — | 3.1 | — | G | 0.17–6.64 | 2.6 | A |
| $F_5$ | 50.2 | 2.7 | 6.0 | 2.4 | 27.4 | — | 8.2 | — | 3.1 | — | G | ≤0.16 | 2.6 | B |
| $F_6$ | 50.2 | 2.7 | 6.0 | 2.4 | 27.4 | — | — | 8.2 | 3.1 | — | G | 0.30–2.42 | 1.2 | A |
| $F_7$ | 50.2 | 2.7 | 6.0 | 2.4 | 27.4 | — | — | 8.2 | 3.1 | — | G | ≤0.07 | 1.2 | B |
| $F_8$ | 50.2 | 2.7 | 6.0 | 2.4 | 20.4 | 7.0 | — | 8.2 | 3.1 | — | NG | ≤0.10 | (4.48) | B |
| $F_9$ | 50.2 | 2.7 | 6.0 | 2.4 | 27.4 | — | 8.2 | — | 3.1 | — | NG | ≤0.11 | (6.55) | B |
| $F_{10}$ | 50.2 | 2.7 | 6.0 | 2.4 | 26.1 | — | 8.2 | — | 3.1 | 1.3 | NG | ≤0.11 | (5300) | B |
| $F_{11}$ | 100 | — | — | — | — | — | — | — | — | — | NG | 0.23–2.20 | 1.12 | A |
| $F_{12}$ | — | 5.8 | 12.0 | 4.8 | 52.2 | — | 16.4 | — | 6.2 | 2.6 | NG | ≤0.11 | 5300 | B |

[Note]
1. Granulated or Not Granulated: G = granulated; NG = not granulated
2. Magnetic Susceptibility: Actual magnetic susceptibilities are shown for the granulated fluxes, those of the constituents exhibiting the highest values are given for the non-granulated fluxes.
3. Classification: A = fluxes satisfying the requirements for the top-layer flux of this invention; B = fluxes not satisfying the requirements for the top-layer flux of this invention.

Table 4 shows the results of the tests conducted on the flux-cored welding electrode wires prepared by feeding different combinations of fluxes $F_1$ to $F_{12}$ shown in Table 3.

TABLE 4

| Test No. | Layered Fluxes | | Evaluation of Cracks | Classification of Specimens |
|---|---|---|---|---|
| | Top Layer | Bottom Layer | | |
| 1 | $F_3$ | $F_1$ | o | This invention |
| 2 | $F_3$ | $F_2$ | o | This invention |
| 3 | $F_3$ | $F_8$ | o | This invention |
| 4 | $F_4$ | $F_4$ | o | This invention |
| 5 | $F_4$ | $F_5$ | o | This invention |
| 6 | $F_4$ | $F_9$ | o | This invention |
| 7 | $F_6$ | $F_{10}$ | o | This invention |
| 8 | $F_{11}$ | $F_{12}$ | o | This invention |
| 9 | $F_5$ | $F_4$ | x | Prior art compared |
| 10 | $F_1$ | $F_6$ | x | Prior art compared |
| 11 | $F_7$ | $F_1$ | x | Prior art compared |
| 12 | $F_2$ | $F_3$ | x | Prior art compared |
| 13 | $F_5$ | $F_5$ | x | Prior art compared |
| 14 | $F_8$ | $F_8$ | x | Prior art compared |
| 15 | $F_{10}$ | $F_{10}$ | x | Prior art compared |

[Note]
1. Evaluation of Cracks: Evaluated based on the incidence of cracks in 100 km of wire finished to a diameter of 1.2 mm.
o = good (wires having no crack)
x = poor (wires having one or more cracks)
2. Ratio of Layered Fluxes: 50% by weight each of the top and bottom layers.

The evaluation of cracks was made in the same manner as in the first preferred embodiment.

Tests Nos. 1 to 8 were conducted on the products according to the second preferred embodiment. The fluxes forming the top layer satisfied the requirement that the magnetic susceptibility $X_g$ is not higher than $4.69 \times 10^{-4}$ emu/g and the particle mass m is not lower than 0.17 mg.

Test No. 1 ($F_3+F_1$): The top layer was made of granulated flux $F_3$ (with both $X_g$ and m within the specified limits), and the bottom layer of granulated flux $F_1$ (with $X_g$ outside and m within the specified limits).

Test No. 2 ($F_3+F_2$): The top layer was made of granulated flux $F_3$ (with both $X_g$ and m within the specified limits), and the bottom layer of granulated flux $F_2$ (with $X_g$ within and m partially within the specified limits).

Test No. 3 ($F_4+F_8$): The top layer was made of granulated flux $F_3$ (with both $X_g$ and m within the specified limits), and the bottom layer of non-granulated flux $F_8$ (with $X_g$ within and m outside the specified limits).

Test No. 4 ($F_4+F_4$): Both top and bottom layers were made of granulated flux $F_4$ with both $X_g$ and m within the specified limits.

Test No. 5 ($F_4+F_5$): The top layer was made of granulated flux $F_4$ (with both $X_g$ and m within the specified limits), and the bottom layer of granulated flux $F_5$ having the same composition but a smaller particle mass (with $X_g$ within and m outside the specified limits) than $F_4$.

Tests Nos. 6 ($F_4+F_9$) and 7 ($F_6+F_{10}$): The top layers were made of granulated fluxes $F_4$ and $F_6$ (with both $X_g$ and m within the specified limits), and the bottom layers of non-granulated fluxes $F_9$ and $F_{10}$ (with $X_g$ partially and m entirely outside the specified limits).

Test No. 8 ($F_{11}+F_{12}$): The top layer was made of non-granulated flux $F_{11}$ (with both $X_g$ and m within the specified limits), and the bottom layer of non-granulated flux $F_{12}$ (with $X_g$ partially and m entirely outside the specified limits).

As is obvious from the test results, the top layer may be formed of either granulated or non-granulated powdery materials. Granulation increases the mass of material particles while equalizing the magnetic susceptibility thereof. Thus, the top layer may be formed of any materials having appropriate magnetic susceptibility and particle mass. The flux-cored welding electrode wires used in the above tests proved to have good quality while realizing satisfactory welding, without being susceptible to cracking that might result if the flux particles stir up and adhere to the magnetized edges of almost closed tubes.

By comparison, tests Nos. 9 to 15 were made on conventional products prepared for the purpose of comparison. The top flux layers used in the wires tested were made of materials not satisfying the requirements of the second preferred embodiment.

Tests Nos. 9 ($F_5+F_4$), 10 ($F_1+F_6$) and 12 ($F_2+F_3$): The top layers were made of granulated fluxes $F_5$, $F_1$ and $F_2$ whose magnetic susceptibility $X_g$ and particle mass m were outside the specified limits, and the bottom layers were made of granulated fluxes $F_4$, $F_6$ and $F_3$ whose magnetic susceptibility $X_g$ and particle mass m were within the specified limits.

Test No. 11 ($F_7+F_1$): The top layer was made of granulated flux $F_7$ with a smaller particle mass m (with $X_g$ within and m outside the specified limits), and the bottom layer was made of granulated flux $F_1$ with a higher magnetic susceptibility $X_g$ (with $X_g$ outside and m within the specified limits).

Tests Nos. 13 ($F_5+F_1$), 14 ($F_8+F_8$) and 15 ($F_{10}+F_{10}$): Both top and bottom layers were made of granulated flux $F_5$ and non-granulated fluxes $F_8$ and $F_{10}$ whose magnetic susceptibility $X_g$ or particle mass m was outside the specified limits.

As a result of the adhesion of the stirred flux to the magnetized edges of almost closed tubes, the conventional wires tested for the purpose of comparison proved susceptible to crack formation and resulting drop in the product yield.

Of the powdery or granular core materials fed into the tube being formed, at least a portion thereof to form the top layer has a magnetic susceptibility lower than the limit specified according to the welding heat input P and a particle mass larger than the limit specified according to the same heat input, and is fed while leaving the specified clearance between the top surface of the core material and the seam to be welded together. This permits feeding the core materials into almost closed tubes without being substantially influenced by the magnetic field induced by high-frequency welding. Consequently, crack formation due to the adhesion of the stirred material powders to the magnetized edges is substantially eliminated. Limiting the particle mass above the limit specified according to the heat input permits mixing a few percents of ferromagnetic ingredients in the core material. Even ferromagnetic ingredients susceptible to the influence of the magnetic field may be fed as such to form the bottom layer of the core. This permits an advantageous choice from among a wider variety of materials.

The Third Preferred Embodiment

The core materials used in the third preferred embodiment of this invention essentially consist of ferromagnetic and paramagnetic substances mixed to specified formulations. The core materials are divided into at least two portions. The first portion consists of a mixture of ferromagnetic and paramagnetic substances, whereas the second portion consists of a mixture of paramagnetic substances alone. While the first portion forms the bottom layer of the core in tubes, the second portion forms the top layer. The proportions of the paramagnetic substances in the first and second portions may be equal to their proportions in the basic formulation.

Various kinds of material powders are selected and used, either as such or in the granulated form, according to the intended use of finished cored tubes. For the flux-cored welding electrode wires, for example, the following paramagnetic substances are mixed as the functioning materials:

Slag formers such as rutile powder and magnesia clinker;

Arc stabilizers such as sodium silicate and potassium titanate; and

Deoxidizers/alloying agents such as low-carbon ferrosilicon, ferrosilicon manganese and aluminum magnesium.

Also, iron powder and other ferromagnetic substances are added for the increase of deposition speed, adjustment of flux packing density, and improvement of welding efficiency. The functioning materials and control additives and their mixing ratios are predetermined for individual flux-cored welding electrode wires, which are collectively called the basic formulations in this preferred embodiment.

The conventional granulated flux materials contain all ingredients thereof. When not granulated, individual ingredients are mixed together to form a single mass of powder. That is, powder of iron or other ferromagnetic substances are present throughout the core materials, whether granulated or not. Therefore, the conventional fluxes, whether granulated or not, involve the risk of getting attracted to the magnetized edges of almost closed tubes during high-frequency welding.

In this preferred embodiment, by contrast, flux F made to the basic formulation consisting of ferromagnetic and paramagnetic substances is divided into flux F1 (portion 1) consisting of a mixture of the ferromagnetic and paramagnetic substances and flux F2 (portion 2) consisting of a mixture of the paramagnetic substances alone. After feeding flux F1 to the lower side of the almost closed tube, flux F2 is fed thereabove. The top layer thus formed of the materials with lower magnetic susceptibilities covers and keeps the bottom layer containing the ferromagnetic substances from stirring up. Therefore, even fluxes containing higher proportions of iron powder or other ferromagnetic substances remain unattracted to the edges 2 of the almost closed tube 1 that are magnetized during high-frequency welding. Here, the ferromagnetic substances are powders of iron, nickel and cobalt, while the paramagnetic substances are substances other than the ferromagnetic ones (including compounds or alloys containing ferromagnetic substances).

In this preferred embodiment, the ferromagnetic substances fed into the lower side of the tube being formed are mixed with, or dispersed through, the paramagnetic substances. Therefore, the ferromagnetic substances (such as iron powder) do not become sintered and compacted when the tube is subjected to stress-relief annealing in the diameter-reduction process or the flux to a dehydrogenating heat treatment. This eliminates the risk of breaking due to the uneven reduction of wall thickness in the diameter-reduction process.

In the flux-cored welding electrode wires according to this preferred embodiment, the paramagnetic substances serving as the functioning materials (i.e., the slag former, arc stabilizer, deoxidizer and alloying agent) are fed to not only the upper side but also the lower side of the tube being formed. Besides, the ferromagnetic substances serving as the controlling materials (such as iron powder) are concentrically fed to the lower side. The flux thus filled has a better conductivity, protrudes less from inside, and provides a higher deposition speed, thus assuring satisfactory welding.

When higher iron contents are required, iron is preferably added as paramagnetic ferroalloys (such as ferrosilicon, ferromanganese and ferrotitanium), rather than iron powder. This reduces the proportion of the ferromagnetic substance (iron powder) in the flux mixture, which, in turn, decreases the need for the shielding by the top layer and permits the manufacture of welding electrode wires cored with fluxes of higher iron contents.

The flux prepared to the basic formulation is divided into the first and second portions as described below.

Flux of basic formulation: Ferromagnetic and paramagnetic substances

First portion: Ferromagnetic and paramagnetic substances

Second portion: Paramagnetic substances

Containing multiple functioning materials, such as slag former, arc stabilizer, deoxidizer/alloying agent, the paramagnetic substances are divided in various ways.

Table 5 shows three typical split patterns, with the individual ingredients put as follows:

Ferromagnetic substance=X

Paramagnetic substances: Slag former=A, B Arc stabilizer=C Deoxidizer-alloying agent=E, F

TABLE 5

| Mixed Material Powders | Ferromagnetic Material Powders | Paramagnetic Material Powders | | | | |
|---|---|---|---|---|---|---|
| | | Slag Former | | Arc Stabilizer | Deoxidizer/Alloying Agent | |
| Material Powders | X | A | B | C | D | E |
| Flux of Basic Formulation | o | o | o | o | o | o |
| Split Pattern 1 | | | | | | |
| Portion 1 | o | o | o | o | o | o |
| Portion 2 | x | o | o | o | o | o |
| Split Pattern 2 | | | | | | |
| Portion 1 | o | o | o | o | x | x |
| Portion 2 | x | o | x | o | o | x |
| Split Pattern 3 | | | | | | |
| Portion 1 | o | x | x | o | o | o |
| Portion 2 | x | o | o | x | o | x |

[Note]
1. o = mixed; x = not mixed
2. The proportions of the individual material powders (X, A, B, . . .) in fluxes of portions 1 and 2 agree with their proportions in the basic flux.

In split pattern 1, both first and second portions contain all paramagnetic substances contained in the basic formulation. In split pattern 2, both first and second portions contain the arc stabilizer and at least one of the slag formers and deoxidizer/alloying agents. In split pattern 3, the first portion contains the arc stabilizer and both deoxidizer/alloying agents but no slag former, whereas the second portion contains both slag formers and one deoxidizer/alloying agent but no arc stabilizer. In all split patterns, the overall proportions of X, A and B in the first and second portions agree with those in the flux of the basic formulation. Assume that the flux of the basic formulation is divided into the first and second portions in a ratio (in % by weight) of n1:n2 (n1+n2=100). Then, the contents Na1 and Na2 (% by weight) of material A (with the content thereof in the basic flux expressed as Na (% by weight)) in the first and second portions are expressed as:

Na=Na1·n1/100+Na2·n2/100

Preferably, the individual ingredients of the core material are dispersed throughout the tube. Flux-cored welding electrode wires containing uniformly dispersed functioning materials bring about better welding performance. Split pattern 1 is recommendable where uniform dispersion of ingredients is required. Preferably, the proportions of the individual paramagnetic substances in the first and second portions are equal to those in the flux of the basic formulation. Let Na, Nb, Nc, . . . denote the proportions of the paramagnetic substances A, B, C, . . . in the basic flux, Na1, Nb1, Nc1, . . . those in the first portion, and Na2, Nb2, Nc2, . . . those in the second portion, then the preferable relationship between them is:

Na:Nb:Nc: . . . =Na1:Nb1:Nc1: . . . =Na2:Nb2:Nc2: . . .

Their proportions in the first and second portions are expressed as follows:

The first portion:
  Proportion of ferromagnetic substance X: Nx1= (Nx·100)/n1 (where Nx=proportion of X in the flux of the basic formulation)
  Proportion of paramagnetic substance A (the same with B, C, . . . ):

$$Na1 = f_1(Na, Nx, n1)$$
$$= \{Na \cdot 100 \cdot (n1 - Nx)\}/\{n1 \cdot (100 - Nx)\}$$

The second portion:
  Proportion of paramagnetic substance A (the same with B, C, . . . ):

Na1=f$_2$(Na, Nx)=(Na·100)/(100−Nx)

Figure 8:
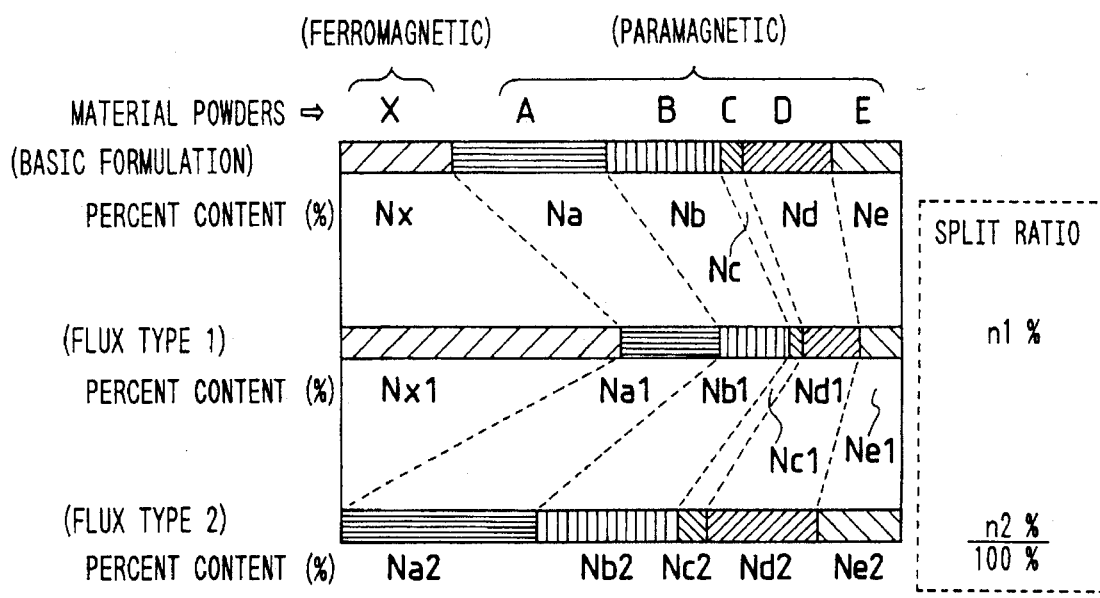
FIG. 8 shows the compositions of the basic and two split fluxes formulated with equal proportions of paramagnetic substances.

Table 6 shows the proportions of the ferromagnetic and paramagnetic substances in the first and second portions, whereas FIG. 8 shows the relationship therebetween.

TABLE 6

| Material Powders | | Basic Formulation | Mixing Ratios of Material Powders (% by weight) Split Formulation | |
|---|---|---|---|---|
| | | | Portion 1 (Bottom Layer) | Portion 2 (Top Layer) |
| Ferromagnetic | X | Nx | Nx1 = (Nx · 100)/n1 | Nx1 = 0 |
| Paramagnetic | A | Na | Na1 = f$_1$ (Na, Nx, n1) | Na2 = f$_2$ (Na, Nx) |
| | | | $= \frac{Na \cdot 100 \cdot (n1 - Nx)}{n1 \cdot (100 - Nx)}$ | $= \frac{Na \cdot 100}{100 - Nx}$ |
| | B | Nb | Nb1 = f$_1$ (Nb, Nx, n1) | Nb2 = f$_2$ (Nb, Nx) |
| | C | Nc | Nc1 = f$_1$ (Nc, Nx, n1) | Nc2 = f$_2$ (Nc, Nx) |
| | D | Nd | Nd1 = f$_1$ (Nd, Nx, n1) | Nd2 = f$_2$ (Nd, Nx) |
| | E | Ne | Ne1 = f$_1$ (Ne, Nx, n1) | Ne2 = f$_2$ (Ne, Nx) |
| Total | | 100% | 100% | 100% |

[Note]
Split ratio (% by weight)
Portion 1 (bottom layer): Portion 2 (top layer) = n1: n2 (n1 + n2 = 100)

In this preferred embodiment, the flux of the basic formulation consisting of ferromagnetic and paramagnetic substances is divided into the first portion containing both substances and the second portion containing only the latter. The first portion is fed to the lower side of the tube being formed and the second portion to the upper side. Therefore, crack formation due to the adhesion of the stirred material powders to the magnetized edges is substantially eliminated. The ferromagnetic substances fed into the lower side of the tube being formed are mixed with, or dispersed through, the paramagnetic substances. Therefore, the ferromagnetic substances (such as iron powder) do not become sintered and compacted when the tube is subjected to stress-relief annealing in the diameter-reduction process or the flux to a dehydrogenating heat treatment. This eliminates the risk of breaking due to the uneven reduction of wall thickness in the diameter-reduction process.

EXAMPLE

An example of the manufacture of flux-cored welding electrode wires is described below.

Figure 9:
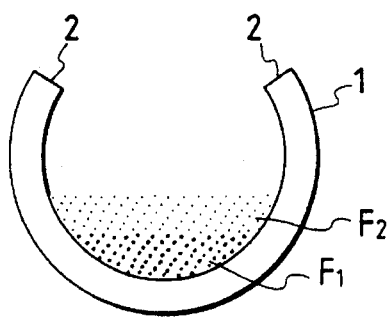
FIG. 9 is a cross-sectional view of the almost closed tube at the flux feeding point, taken along the line 9—9 of FIG. 4.
Figure 10:
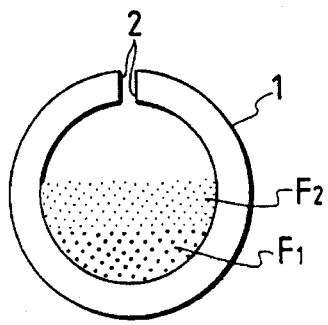
FIG. 10 is a cross-sectional view of the almost closed tube at the work coil, taken along the line 10—10 of FIG. 4.

The flux feeder 13 in the apparatus shown in FIG. 4 feeds flux F$_1$ to form the bottom layer of the core in the open tube 1 being formed, then the flux feeder 14 feeds flux F$_2$ to form the top layer thereabove. The open tube 1 filled with the fluxes F1 and F2 passes through the finpass rolls 15 and seam-guide rolls 19 into the welding zone. Taken along the line 9—9 of FIG. 4, FIG. 9 shows a cross section of the tube just fed with the flux F2, whereas FIG. 10 shows a cross section of the same tube in the welding zone taken along the line 10—10 of FIG. 4. As is illustrated, the upper layer of the flux F2 covers the lower layer of the flux F1.

As in the first preferred embodiment, steel strips having a width w of 30 too 150 mm and a thickness t of 1.0 to 5.0 mm were formed into tubes having an outside diameter $D_0$ of 10 to 50 mm. The heat input and other welding conditions were the same as in the first preferred embodiment.

The electric current supplied in high-frequency welding builds up a magnetic field inside the tube being welded to magnetize the edges of the tube. The magnetized edges attract the ferromagnetic particles at the surface of the core flux. In this preferred embodiment, the first flux containing rutile powder and other paramagnetic substances and iron powder and other ferromagnetic substances is fed to the lower side. Then, the second flux consisting of only paramagnetic substances is fed on top of the first flux. The shielding second flux unsusceptible to magnetic attraction prevents the stirring of the first flux toward the edges of the tube being welded (see FIGS. 9 and 10).

The cracks occurred in the flux-cored welding electrode wires thus prepared are described below.

Steel strip 2.5 mm thick and 75.0 mm wide (according to JIS G 3131 SPHC and containing 0.05% carbon) was formed into tubes having an outside diameter of 25.5 mm and an inside diameter of 20.5 mm. The open tube 10 to 20 % filled with the flux were continuously butt-welded. The frequency of the current supplied to the work coil was 500 kHz, while the heat input $(E_p I_p)P$ and the welding speed V were 160 kVA V 35 m per minute, respectively. The distance between the work coil and the welding spot was 30 mm and the apex angle was 7 degrees. The outside diameter of the welded tubes was reduced through rolling rolls from 25.5 mm to 4.0 mm, with annealing applied once midway. After annealing, dehydrogenating heat treatment (at 700° C.) and plating, the tubes were coiled up, and then drawn to the finished products having an outside diameter of 1.2 to 1.6 mm through bored or roller dies. The obtained products were inspected for the presence of cracks.

Table 7 shows the proportions of the ferromagnetic (iron powder) and paramagnetic substances in the fluxes of the basic formulations. The fluxes prepared to the four different formulations shown in Table 7 were divided according to the patterns shown in Table 5 into different combinations of the first (consisting of both ferromagnetic (iron powder) and paramagnetic substances) and the second (consisting of the paramagnetic substances alone) fluxes shown in Table 8. The first and second fluxes were prepared by mixing the ingredients contained in the individual basic formulations shown in Table 7. Some fluxes were granulated and the others were not. While the particle size of the individual substances was not larger than 250 μm, that of the granulated fluxes was not larger than 1500 μm.

TABLE 7

| Mixed Material Powders | | | | Mixing Ratios of Basic Formulation (% by weight) | | | |
|---|---|---|---|---|---|---|---|
| | | | | F-1 | F-2 | F-3 | F-4 |
| Ferromagnetic | Iron Powder | | X | 10.0 | 15.0 | 20.0 | 25.0 |
| Paramagnetic | Slag Former | Rutile Powder | A | 40.0 | 37.0 | 35.0 | 30.0 |
| | | Silica Sand | B | 4.0 | 4.0 | 4.0 | 4.0 |
| | | Zirconium Silicate | C | 7.0 | 7.0 | 7.0 | 7.0 |
| | Arc Stabilizer | Potassium Titanate | D | 3.0 | 3.0 | 3.0 | 3.0 |
| | Deoxidizer/ Alloying Agent | Ferrosilicon Manganese | E | 20.0 | 19.0 | 17.0 | 17.0 |
| | | Ferromanganese | F | 10.0 | 9.0 | 8.0 | 8.0 |
| | | Aluminum Magnesium | G | 6.0 | 6.0 | 6.0 | 6.0 |

TABLE 8

| Test No. | Basic Formulation | Top/ Bottom Layer | Split Formulation | Ferromagnetic | Paramagnetic | | | | | | |
|---|---|---|---|---|---|---|---|---|---|---|---|
| | | | | | Slag Former | | | Arc Stabilizer | Deoxidizer/ Alloying Agent | | |
| | | | | X | A | B | C | D | E | F | G |
| 1 | F-1 | Top | Type 2 | 0 | 44.4 | 4.4 | 7.8 | 3.3 | 22.2 | 11.1 | 6.7 |
| | | Bottom | Type 1 | 20.0 | 35.6 | 3.6 | 6.2 | 2.7 | 17.8 | 8.9 | 5.3 |
| 2 | | Top | Type 2 | 0 | 39.9 | 5.3 | 7.0 | 3.4 | 26.6 | 11.0 | 6.8 |
| | | Bottom | Type 1 | 25.0 | 40.2 | 2.1 | 7.0 | 2.4 | 10.1 | 8.5 | 4.8 |
| 3 | F-2 | Top | Type 2 | 0 | 43.5 | 4.7 | 8.2 | 3.5 | 22.4 | 10.6 | 7.1 |
| | | Bottom | Type 1 | 25.0 | 32.6 | 3.5 | 6.2 | 2.6 | 16.8 | 7.9 | 5.3 |
| 4 | | Top | Type 2 | 0 | 59.0 | 0 | 0 | 3.0 | 38.0 | 0 | 0 |
| | | Bottom | Type 1 | 30.0 | 15.0 | 8.0 | 14.0 | 3.0 | 0 | 18.0 | 12.0 |
| 5 | F-3 | Top | Type 2 | 0 | 43.8 | 5.0 | 8.8 | 3.8 | 21.3 | 10.0 | 7.5 |
| | | Bottom | Type 1 | 50.0 | 21.9 | 2.5 | 4.4 | 1.9 | 10.6 | 5.0 | 3.8 |
| 6 | | Top | Type 2 | 0 | 70.0 | 8.0 | 14.0 | 0 | 8.0 | 0 | 0 |
| | | Bottom | Type 1 | 40.0 | 0 | 0 | 0 | 6.0 | 26.0 | 16.0 | 12.0 |
| 7 | F-4 | Top | Type 2 | 0 | 40.0 | 5.3 | 9.3 | 4.0 | 22.7 | 10.7 | 8.0 |
| | | Bottom | Type 1 | 50.0 | 20.0 | 2.7 | 4.7 | 2.0 | 11.3 | 5.3 | 4.0 |
| 8 | | Top | Type 2 | 0 | 40.0 | 5.3 | 9.3 | 4.0 | 22.7 | 10.7 | 8.0 |

TABLE 8-continued

|   |   |   |   |   |   |   |   |   |   |   |   |   |
|---|---|---|---|---|---|---|---|---|---|---|---|---|
|   |   | Bottom |   |   |   |   |   |   |   |   |   |   |
|   |   | Top | Type 1 | 20.8 | 31.7 | 4.2 | 7.4 | 3.2 | 17.0 | 8.4 | 6.3 |   |
|   |   | Bottom | Type 1 | 62.5 | 15.0 | 2.0 | 3.5 | 1.5 | 8.5 | 4.0 | 3.0 |   |
| 9 | F-5 | Top | Type 2 | 0 | 43.5 | 4.7 | 8.2 | 3.5 | 22.4 | 10.6 | 7.1 |   |
|   |   | Bottom |   |   |   |   |   |   |   |   |   |   |
|   |   | Top | Type 1 | 37.5 | 27.2 | 2.9 | 5.1 | 2.2 | 14.0 | 6.6 | 4.4 |   |
|   |   | Bottom | Type 1 | 0 | 43.5 | 4.7 | 8.2 | 3.5 | 22.4 | 10.6 | 7.1 |   |
| 10 |  | F-1 |  | 10.0 | 40.0 | 4.0 | 7.0 | 3.0 | 20.0 | 10.0 | 6.0 |   |
| 11 |  | F-2 |  | 15.0 | 37.0 | 4.0 | 7.0 | 3.0 | 19.0 | 9.0 | 6.0 |   |
| 12 |  | F-3 |  | 20.0 | 35.0 | 4.0 | 7.0 | 3.0 | 17.0 | 8.0 | 6.0 |   |
| 13 |  | F-4 |  | 25.0 | 30.0 | 4.0 | 7.0 | 3.0 | 17.0 | 8.0 | 6.0 |   |

| Test No. | Split Ratios (%) | Granulated or Not Granulated | Paking Density (%) | Evaluation of Cracks | Classification | Remarks |   |
|---|---|---|---|---|---|---|---|
| 1 | 50 | G | 12 | o | This invention | Equally mixed |   |
|   | 50 | G |   |   |   |   |   |
| 2 | 60 | NG | 11 | o | This invention | Split pattern 1 |   |
|   | 40 | NG |   |   |   |   |   |
| 3 | 40 | G | 15 | o | This invention | Equally mixed |   |
|   | 60 | G |   |   |   |   |   |
| 4 | 50 | NG | 15 | o | This invention | Split pattern 2 |   |
|   | 50 | G |   |   |   |   |   |
| 5 | 60 | G | 17 | o | This invention | Equally mixed |   |
|   | 40 | G |   |   |   |   |   |
| 6 | 50 | G | 17 | o | This invention | Split pattern 3 |   |
|   | 50 | G |   |   |   |   |   |
| 7 | 50 | G | 20 | o | This invention | Equally mixed |   |
|   | 50 | G |   |   |   |   |   |
| 8 | 40 | NG | 20 | o | This invention | Three-layer filling (Equally mixed) |   |
|   | 30 | G |   |   |   |   |   |
|   | 30 | G |   |   |   |   |   |
| 9 | 40 | G | 17 | o | This invention | Three-layer filling (Equally mixed) |   |
|   | 40 | G |   |   |   |   |   |
|   | 20 | G |   |   |   |   |   |
| 10 | — | G | 15 | x |   |   |   |
| 11 | — | G | 15 | x | Prior art compared | One-Layer filling |   |
| 12 | — | G | 15 | x |   |   |   |
| 13 | — | G | 15 | x |   |   |   |

[Note]
1. Three-layer filling: The bottom layer was further divided into two layers in tests Nos. 8 and 9.
2. Granulated or Not Granulated: G = granulated; NG = not granulated
3. Final Diameter: 1.2 mm in tests Nos. 1 and 2, 1.4 mm in tests Nos. 3, 4, 5, 10, 11, 12 and 13, and 1.6 mm in tests Nos. 6, 7, 8 and 9.
4. Evaluation of Cracks: Evaluated based on the incidence of cracks in 100 km of wire finished to a diameter of 1.2 mm.
o = good (wires having no crack)
x = poor (wires having one or more cracks)

Cracks were evaluated by the same method as in the first preferred embodiment.

Tests Nos. 1 to 9 were conducted on the products according to the third preferred embodiment.

In the tubes used in tests Nos. 1 to 9, the second flux (of paramagnetic substances) covered and held down the underlying first flux (of ferromagnetic (iron powder) and paramagnetic substances. Therefore, the magnetic field built up in the tubes did not stir the underlying first flux, thus preventing cracking that might otherwise have occurred if the ferromagnetic particles of the first flux adhered to the magnetized edges.

In the tube used in test No. 8, the bottom layer of the first flux was subdivided, with the lowermost layer containing a higher percentage of iron powder than the one on top thereof. This pattern proved effective with the flux of the basic formulation containing larger proportions of iron powder. In the tube used in test No. 9, the second flux was fed not only as the top layer but also as the lowermost layer. This pattern proved effective in achieving a uniform dispersion of the functioning materials of the basic formulations throughout the tube.

Mixed and dispersed with the paramagnetic substances A, B, C, D, E, F and G, iron powder X remained unsintered by the heat treatments. While no sintering-induced breaking occurred, satisfactory welding was performed.

By comparison, tests Nos. 10 to 13 were made on conventional products prepared for the purpose of comparison. The tubes used in tests Nos. 10 to 13 had single-layer cores of basic formulations F-1, F-2, F-3 and F-4 consisting of ferromagnetic (iron powder) and paramagnetic substances. The magnetized edges of the almost closed tubes attracted the ferromagnetic particles (i.e., iron powder or granulated fluxes containing iron powder) stirred under the influence of the magnetic field built up therein. The resulting cracks lowered the product yield.

Though not shown in the table, the basic formulation flux F-1 (consisting of ferromagnetic (10% iron powder) and paramagnetic substances) was divided into two separate fluxes, one consisting of the ferromagnetic substance (iron powder) and the other of the paramagnetic substances A to G. While the flux of the ferromagnetic substance formed the bottom layer, that of the paramagnetic substances formed the top layer. The overlying layer of the paramagnetic substances kept the underlying layer of iron powder from adhering to the magnetized edges of the almost closed tubes, thereby preventing the occurrence of cracks. However, the iron powder constituting the bottom layer became sintered and compacted during the heat treatments. The sintered iron powder proved responsible to the frequent breaking in the diameter-reduction operations (particularly in the finish-drawing process) and the lowering of the product yield.

The Fourth Preferred Embodiment

The characteristic of the fourth preferred embodiment is that ferromagnetic particles are magnetically drawn away from the surface of the core materials in the tube before the edges thereof are joined together by high-frequency welding.

The removal of ferromagnetic particles by magnetic means may be carried out before and/or after the feeding of the core materials into the tube being formed.

The magnetic removal of ferromagnetic particles is achieved by means of a magnetic field substantially equal to the one built up in the tube at the welding spot that is established in the path of the core materials by placing a permanent magnet or an electromagnet.

The ferromagnetic particles as used here are the particles having as much magnetism as to be attracted to the edges of almost closed tubes that are magnetized during high-frequency welding. Such magnetism stems from not only the core materials themselves (such as those containing excess or segregated ferromagnetic ingredients) but also foreign matters (such as metal powders fretted away from machines and other substances) mixed in the course of core materials preparation. Concrete examples are given below:

(1) Fine particles of ferromagnetic ingredients and segregated iron, and those reduced from coarser particles.

(2) Foreign matters mixed in the core materials (such as powders of the core materials and other foreign matters formed in the preparation process, shavings and fretted powders of strip and forming rolls).

Eliminating magnetic particles having great enough magnetism to cause attraction to the magnetized edges of almost closed tubes from the surface of the core materials contained therein, this preferred embodiment always keeps clean the edges subjected to high-frequency welding. As a consequence, tube cracking due to the adhesion of magnetic particles to the magnetized edges does not occur.

No special consideration is required as to the magnetic particles in the bottom layer which is covered by the top layer and, thus, not attracted to the magnetized edges of the tube.

EXAMPLE

Figure 11:
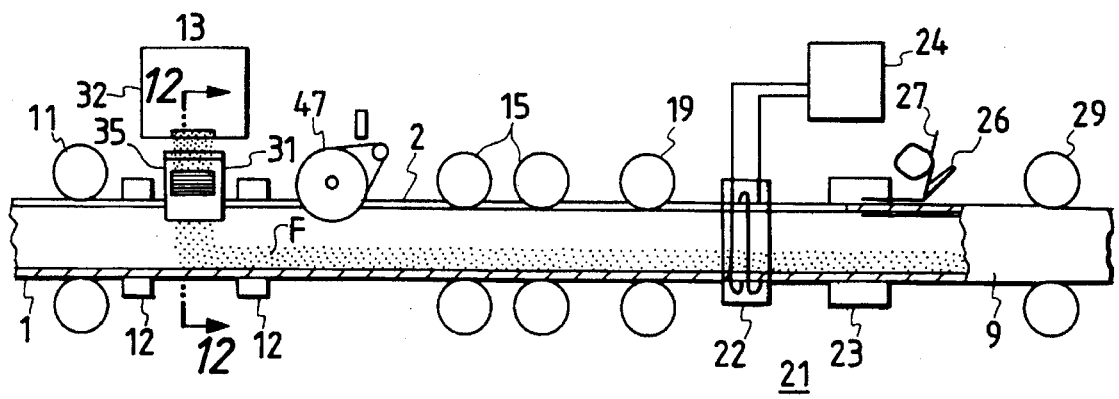
FIG. 11 shows another embodiment of apparatus for manufacturing cored tubes according to this invention or, more specifically, the principal part of an apparatus for manufacturing flux-cored welding electrode wires.

An example of the manufacture of flux-cored welding electrode wires is described below. FIG. 11 shows the principal part of an apparatus for manufacturing flux-cored welding electrode wires. Similar reference characters denote the apparatus and members similar to those shown in FIG. 4, and no description is given thereof.

Forming rolls 11, side rolls 12 and a flux feeder 13 are disposed along the pass line of an open tube 1, as shown in FIG. 11. The flux feeder 13 comprises a flux hopper 32, a chute 33 and an electromagnetic feeder 35. The flux feeder 13 also has at least one of a first magnetic remover 31 and a second magnetic remover 47 that attract and remove the magnetic particles from the flux F before and after its feeding into the open tube 1. The first magnetic remover 31 is intended for use before feeding and the second magnetic remover 47 for after feeding.

The first magnetic remover 31 is described below by reference to FIGS. 11, 12 (a cross section taken along the line 12—12 of FIG. 11), 13 (a cross section taken along the line 13—13 of FIG. 12), and 14. The magnetic remover 31 removes magnetic particles from the flux F before it is fed into the open tube 1. In the illustrated apparatus, magnetic particles are removed from the flux F that is being delivered by the electromagnetic feeder 35 between the flux hopper 32 (chute 33) and the open tube 1. The magnetic remover 31 comprises two pulleys 40 and 41 (one of which is a driving pulley), a belt passed over the pulleys 40 and 41, and a permanent magnet 44 provided between the pulleys 40 and 41 and across from the trough (having a vibrating delivery surface) 36 of the electromagnetic feeder 35 with the belt 42 disposed therebetween. While one pulley 40 is installed above the trough 36, the other pulley 41 is placed on the far side of the trough 36 and open tube 1, whereby the belt 42 travels from above the trough 36 in the delivery direction of the trough 36 to a point beyond the opening in the tube 1. The permanent magnet 44 held in contact with the inside of the lower side of the belt 42 extends from above the trough 36 to beyond the opening in the tube 1.

The flux F discharged from the flux hopper 32 travels through the chute 33 to the trough 36 of the electromagnetic feeder 35 and further, while jumping on the trough 36, toward the opening in the tube 1. The lower surface 45 (which constitutes the north pole in this embodiment) of the permanent magnet 44 in the magnetic remover 31 attracts the magnetic particles a in the flux F to the belt 42. The belt 42 carries the attracted particles over the opening in the tube 1 and drops them into a container 46 placed outside the reach of the attraction exerted by the permanent magnet 44. The flux F thus freed of the magnetic particles a falls from the delivery end of the trough 6 into the tube 1 through the opening therein.

Figure 12:
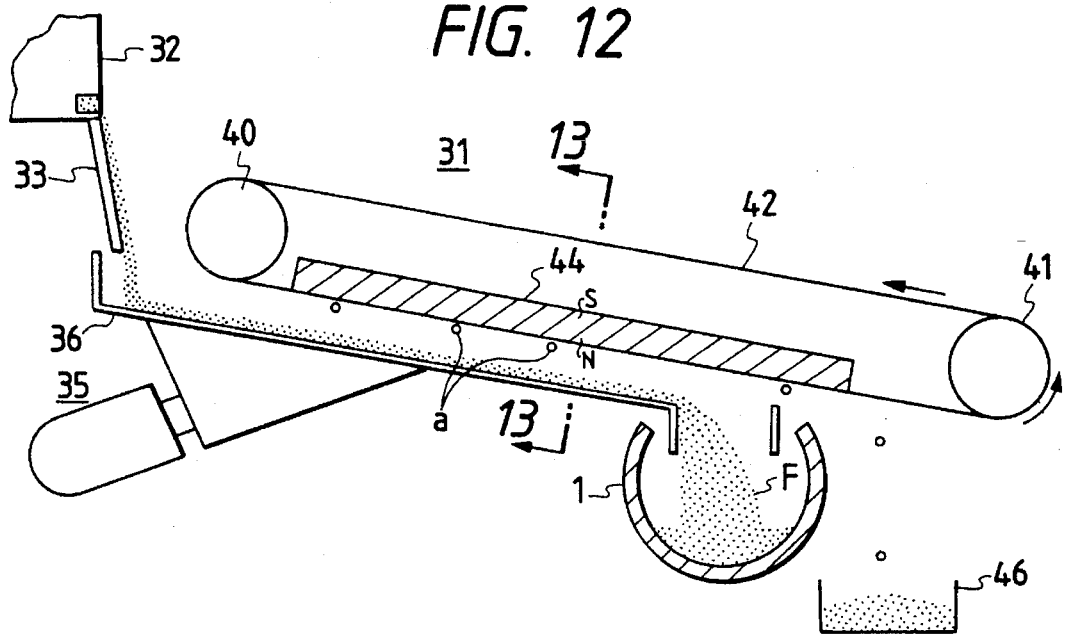
FIG. 12 is a cross-sectional view of a first magnetic attracting device.
Figure 13:
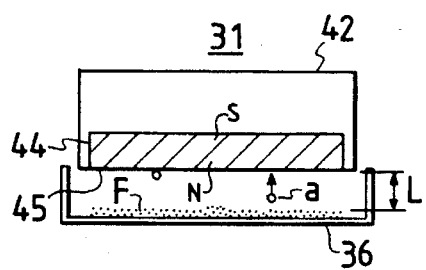
FIG. 13 is a cross-sectional view taken along the line 13—13 of FIG. 12.

Because the magnetic remover 31 acts on the flux F traveling and jumping on the trough 36, almost all particles constituting the flux F are exposed to the attraction of the permanent magnet. Therefore, few magnetic particles a remain unremoved. FIGS. 12 and 13 show an example that processes the entirety of the flux F fed into the open tube 1 with the electromagnetic feeder 35 having the single trough 36. However, the magnetic particles a may not be removed from other parts of the flux F than one that constitutes the top surface of the core in the tube. A partitioned trough shown in FIG. 14 consists of separate troughs 37 and 38 that vibrate and transport separate feeds F1 and F2 of the flux. Then, the magnetic remover 31 removes magnetic particles a from only the feed F2 that forms the top surface of the core.

Now the second magnetic remover 47 is described by reference to FIGS. 11, 15 (which enlarges the principal part of FIG. 11) and 16 (a cross section taken along the line 16—16 of FIG. 15). The magnetic remover 47 removes magnetic particles from the flux F after it has been fed into the open tube 1. The magnetic remover 47 comprises a disk-shaped rotary magnet 48, a pulley 53 and a belt 54 passed over the rotary magnet 48 and pulley 53. The rotary magnet 48 to attract magnetic particles a comprises small rectangular magnets 50 fastened to all sides (twelve in number) of a dodecagonal steel base 49 so that the same pole (which is the north pole in this embodiment) is disposed outward. The disk-shaped permanent magnet whose periphery constitutes the north pole as a whole turns about a shaft 52. A lower portion of the rotary magnet 48 is inserted into the open tube 1 through an opening between the edges 2 thereof, with a given clearance L left between the periphery 51 and the surface of the flux contained therein. The pulley 53 disposed outside the open tube 1 takes the belt 54 away from the rotary magnet 48, thus moving the magnetic particles a carried by the belt 54 outside the reach of the attraction exerted by the rotary magnet 48 and facilitating the removal thereof. Side plates 55 to prevent the dislocation of the belt 54 are provided on both sides of the rotary magnet 48.

In the magnetic remover 47 just described, the rotary magnet 48 attracts magnetic particles a from the surface layer Fu of the flux F passing therebelow to the belt 54. The belt 54 carries the attracted particles a outside the open tube 1 up to the point where the belt 54 leaves the rotary magnet 48 and a vacuum aspirator 56 removes the particles therefrom. The magnetic particles may also be carried further to the pulley 53 and dropped into a container 59 placed therebelow as shown by a dotted line.

In the first magnetic remover 31 (working on the core materials before feeding) and the second magnetic remover 48 (working on the core materials after feeding), the permanent magnet and electromagnet disposed out of contact with the surface of the core materials emit lines of magnetic flux that attract magnetic particles. The force (or the surface magnetic flux density) of the magnet and the clearance between the magnetic pole and the surface of the flux are preferably determined for individual core materials so that the magnetic particles have an attraction-to-gravity ratio exceeding 1 and the safe particles not adhering to the edges of the open tube at the welding spot have an attraction-to-gravity not greater than 1. The attraction-to-gravity ratio used here depends on the magnetic flux density at the surface of the flux, magnetic susceptibility of particles, content of ferromagnetic ingredients, mass of particles and other factors. Preferably, the attracting force of the first and second magnetic removers 31 and 47 must be made substantially equal to the attraction exerted by the tube edges magnetized at the welding spot.

The cracks occurred on the flux-cored welding electrode wires manufactured by the above apparatus are described below.

Steel strips 2.2 mm thick and 65.5 mm wide were formed into tubes having an outside diameter of 22.4 mm and an inside diameter of 18.0 mm. The open tubes 13% filled with flux were continuously butt-welded. The frequency of the current supplied to the work coil was 520 kHz, while the heat input was 150 kVA and the welding speed V was 30 m per minute. The distance between the work coil and the welding spot was 25 mm and the apex angle was 6 degrees. The outside diameter of the welded tubes was reduced through rolling rolls from 22.4 mm to 3.2 mm, with annealing applied once midway. The tubes were annealed, plated, coiled up, and then drawn to the finished products having an outside diameter of 1.2 mm and an inside diameter of 0.6 mm. The obtained products were inspected for the presence of cracks.

Under the conditions just described, satisfactory high-frequency induction welding is assured so long as the edges to be butt-welded are clean. However, this welding method builds up a strong magnetic field that stirs up the magnetic particles contained in the core materials. Therefore, the edges of almost closed tubes reaching the welding spot are not always clean. In this embodiment, therefore, such magnetic particles were magnetically removed from the surface of the core materials in the open tubes. The first and second magnetic removers 31 and 48 were used either singly or jointly.

Table 9 shows the fluxes used, which were prepared by mixing material powders. The mixtures were granulated by the addition of a binder (water glass), dried and classified.

TABLE 9

| Material Powders | Mixing Ratios (% by weight) |
| --- | --- |
| Rutile powder | 40 |
| Silica sand | 6 |
| Zirconium silicate | 8 |
| Potassium titanate | 3 |
| Ferrosilicon manganese | 23 |
| Ferromanganese | 10 |
| Aluminum magnesium | 4 |
| Iron Powder | 6 |
| Particle size | 1.0 mm~Dust |

TABLE 10

| Test No. | Magnetic Removers | | Evaluation | |
| --- | --- | --- | --- | --- |
| | Remover 1 | Remover 2 | of Crackas | Classification |
| 1 | Apparatus shown in FIG. 14 Magnetic flux density of magnetic pole: 1800 gausses Clearance: L = 15 mm | — | o | This Invention |
| 2 | — | Apparatus shown in FIG. 15 Magnetic flux density of magnetic pole: 2200 gausses Clearance: L = 10 mm | o | This Invention |
| 3 | Apparatus shown in FIG. 12 Magnetic flux density of magnetic pole: 1500 gausses Clearance: L = 15 mm | Apparatus shown in FIG. 15 Magnetic flux density of magnetic pole: 2200 gausses Clearance: L = 10 mm | o | This Invention |
| 4 | — | — | x | Prior Art Compared |

[Note]
Evaluation of Cracks: Evaluated based on the incidence of cracks in 100 km of wire finished to a diameter of 1.2 mm. Wires having no crack was evaluated as good (o) and those having one or more cracks as poor (x).
Magnetic Flux Density of Magnetic Pole: Maximum magnetic flux density at the surface of the magnetic pole.
Clearance: Distance between the magnetic pole and the surface of the flux.

The evaluation of cracks was made in the same manner as in the first preferred embodiment.

Tests Nos. 1 to 3 in Table 10 were made on the flux-cored welding electrode wires of this invention prepared by the use of the magnetic particle removers. The wires were crack-free and had adequate quality to assure satisfactory welding.

By comparison, test No. 4 was conducted on the conventional wire prepared for the purpose of comparison without employing the magnetic removers. The magnetic field resulting from high-frequency welding stirred up magnetic particles from the surface of the core materials to cause the contamination of the tube edges that led to cracking and a drop in the product yield.

The Fifth Preferred Embodiment

The characteristic of the fifth preferred embodiment is that magnetic particles are magnetically drawn away from the surface of the core materials in the tube before the edges thereof are joined together by high-frequency welding.

The magnetic particles as used here means all particles that can be magnetically attracted to the edges of almost closed tubes that are magnetized when subjected to high-frequency welding. They include not only the magnetic particles at the surface of the core materials in the tubes but also those on the inner wall and open edges thereof such as:

(1) Shavings from strip edges (resulting from slitting or edge scarfing);

(2) Shavings of strip produced in the forming process and unremoved from the strip surface;

(3) Metal powders worn off from forming rolls (particularly from the fin-pass and seam-guide rolls);

(4) Magnetic particles stirred up by the oil fumes resulting from the heating of the tubes being welded; and (5) Dusts moving from forming rolls (particularly from the fins of the fin-pass rolls) to the magnetized edges of the tubes being welded.

This preferred embodiment always keeps clean the edges of the open tubes to be welded by magnetically removing not only the magnetic particles in the core materials therein, particularly those at the surface of the core materials, but also the shavings and other foreign matters resulting from the forming and other processes, between the core material feeder and the welding spot.

A magnet is disposed away from the surface of the core materials in the almost closed tube. The pole face directed to the surface of the core materials assures efficient attraction of magnetic particles, facilitating the passage of the magnetic flux from the pole face through the magnetic particles and retarding the attenuation of the magnetic flux density at the surface of the core materials. The force (or the surface magnetic flux density) of the magnet and the clearance between the magnetic pole and the surface of the flux are determined for individual types of core materials so that the magnetic particles have an attraction-to-gravity ratio exceeding 1 and the safe particles not adhering to the edges of the open tube at the welding spot have an attraction-to-gravity not greater than 1. The attraction-to-gravity ratio used here depends on the magnetic flux density at the surface of the flux, magnetic susceptibility of the particles, mass of particles and other factors.

The shavings and other foreign matters unavoidably resulting from the roll forming and other processes are also similarly removed as they can cause weld cracking and spattering.

EXAMPLE

Figure 17:
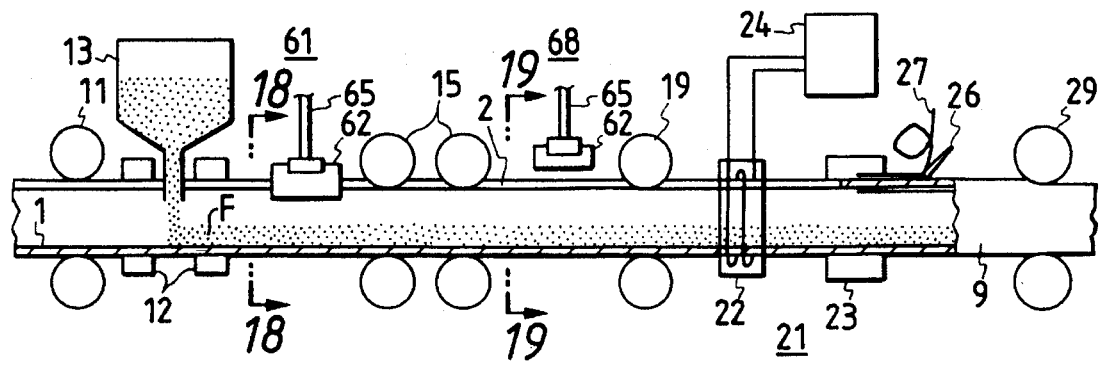
FIG. 17 shows another embodiment of apparatus for manufacturing cored tubes according to this invention or, more specifically, the principal part of an apparatus for manufacturing flux-cored welding electrode wires.

An example of the manufacture of flux-cored welding electrode wires is described below. FIG. 17 shows the principal part of an apparatus for manufacturing flux-cored welding electrode wires.

As is illustrated, this apparatus is essentially analogous to the one shown in FIG. 4. Devices to magnetically remove magnetic particles from the surface layer F of the flux 20 in the open tube 1 and shavings and other foreign matters from the edges 2 thereof are disposed between a flux feeder 13 and a high-frequency induction welder 21.

This apparatus is described by reference to FIGS. 17, 18 (a cross section taken along the line 18—18 of FIG. 17), and 19 (a cross section taken along the line 19—19 of FIG. 17). A first magnetic remover 61 is provided just behind the flux feeder 13, while a second magnetic remover 68 is provided between the fin-pass rolls 15 and the seamguide rolls 19.

Figure 18:
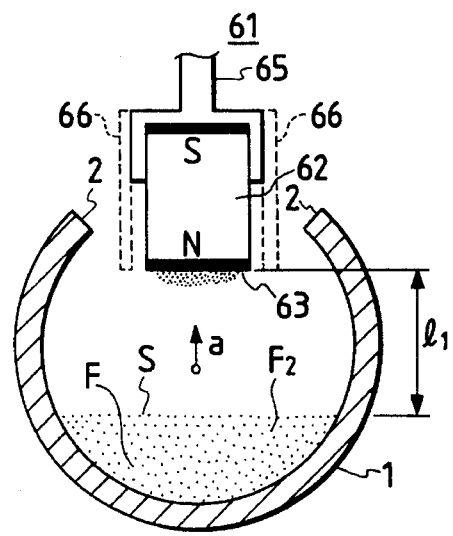
FIG. 18 is a cross-sectional view taken along the line 18—18 of FIG. 17.

As shown in FIGS. 17 and 18, the first magnetic remover 61 comprises a permanent magnet 62 and a holder 65. The permanent magnet 62 suspended from the holder 65 is inserted into the open tube 1 through the opening between the edges 2 thereof, with one pole face 63 (the north pole) thereof facing downward and the other pole face (the south pole) remaining outside the tube. A clearance $l_1$ is left between the pole face 63 (the north pole) and the surface s of the core materials. The clearance $l_1$ is such that the magnetic flux density at the surface s is large enough to attract magnetic particles a from the surface layer $F_2$ of the core materials. In order to keep the magnetization of the edges 2 to a minimum, both pole faces (the north and south poles) are disposed somewhat away from the edges 2 and the holder 65 is made of nonmagnetic material (such as brass). Thus, the magnetic flux emitted from the pole face 63 (the north pole) covers the nearby surface s of the core materials, efficiently attracting magnetic particles a from the surface layer $F_2$. The attracted magnetic particles a ascend along the line of magnetic force to, and collect at, the pole face 63 (the north pole).

Like the first magnetic remover 61, the second magnetic remover 68 also comprises a permanent magnet 62 and a holder 65 of nonmagnetic material, as shown in FIGS. 17 and 18. The permanent magnet 62 is outside the open tube, with one pole face 63 (the north pole) thereof facing downward and kept away from the edges 2 of the tube by a clearance $l_2$. The clearance $l_2$ is such that the magnetic flux density at the tube edges is large enough to attract magnetic particles a, shavings and other foreign matters therefrom. The attracted magnetic particles a ascend along the line of magnetic force to, and collect at, the pole face 63 (the north pole). The magnetic particles a on the pole face 63 are intermittently or continuously removed.

The magnetic removers of this embodiment are not limited to the simple rectangular permanent magnets described above. The following different types of magnets can be used in other possible modifications:

(1) A disk-shaped permanent magnet rotated to simultaneously carry out the attraction of magnetic particles and the removal of the attracted particles from the pole face.

(2) A permanent magnet surrounded with a rotary belt of nonmagnetic material or a rotary magnet belt to magnetically attract magnetic particles in the tube and dispose of them outside.

(3) A permanent magnet 62 disposed between magnetic shielding steel plates 66, as indicated by a dotted line in FIG. 18, to restrain the magnetization of the tube edges 2.

(4) An electromagnet (whose attraction can be controlled with ease).

Also, the positions of the magnetic removers are not limited to those described above but may be changed suitably. For example, the magnetic removers may be disposed before and after the work coil. If possible, an additional bar magnet may be inserted along the length of the tube in a space between the core materials and the opening in the almost closed tube. A magnetic remover may also be provided upstream of the material feeder to remove the shavings and other foreign matters resulting from the forming operation beforehand.

The cracks occurred on the flux-cored welding electrode wires manufactured on the above apparatus are described below. The tube material, welding method, product sizes and other details are the same as in the fourth preferred embodiment.

Figure 19:
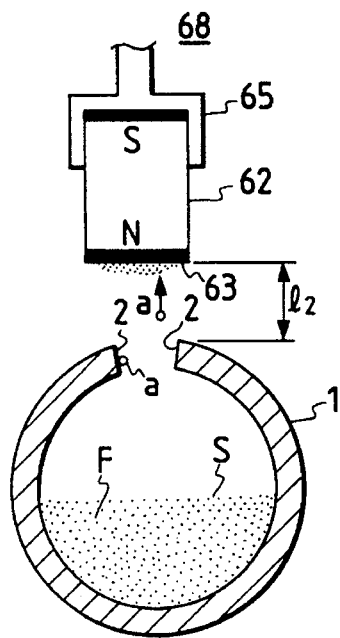
FIG. 19 is a cross-sectional view taken along the line 19—19 of FIG. 17.

Under the conditions just described, satisfactory high-frequency induction welding is assured so long as the edges to be butt-welded are clean. However, this welding method builds up a strong magnetic field that stirs up the magnetic particles contained in the core materials. Therefore, the edges of almost closed tubes reaching the welding spot are not always clean. In this embodiment, therefore, such magnetic particles were magnetically removed from the surface of the core materials in the open tubes, using the magnetic removers shown in FIGS. 17 to 19. All permanent magnets 62 constituting the magnetic removers were of the same rectangular shape measuring 40 mm by 25 mm by 10 mm, with the pole face 63 measuring 40 mm by 10 mm and having a surface magnetic flux density of 1500 gausses. The permanent magnet 62 in the first magnetic remover is suspended from above, with a clearance $l_1$ left between the pole face 63 thereof and the surface s of the core materials in the tube. The permanent magnet 62 in the second magnetic remover is suspended from above, with a clearance $l_2$ left between the pole face 63 thereof and the open edges 2 of the tube.

The same fluxes as shown in Table 9 were used. They were prepared by mixing material powders. The mixtures were granulated by the addition of a binder (water glass), dried and classified into fluxes $F_1$ and $F_2$.

TABLE 11

| Material Powders | Type of Flux | |
|---|---|---|
| | $F_1$ [wt %] | $F_2$ [wt %] |
| Rutile powder | 45.8 | 47.2 |
| Silica sand | 3.1 | 2.7 |
| Zirconium silicate | 8.3 | 6.0 |
| Potassium titanate | 3.7 | 2.4 |
| Ferrosilicon manganese | 27.9 | 26.1 |
| Ferromanganese | — | 8.2 |
| Metal manganese | 8.5 | — |
| Aluminum magnesium | 2.7 | 3.1 |
| Iron Powder | — | 4.3 |
| Particle size | 0.5 mm~Dust | 1.0 mm~Dust |

The evaluation of cracks was made in the same manner as in the first preferred embodiment.

Tests Nos. 1 to 4 in Table 12 were made on the flux-cored welding electrode wires of this invention prepared by the use of the magnetic particle removers just described. Tests Nos. 1 and 2 were conducted by the use of only the first magnetic remover, whereas tests Nos. 3 and 4 were made with both of the first and second magnetic removers. Though crack-free satisfactory results were obtained in all tests, some spatterings were observed in tests Nos. 1 and 2, as compared with tests Nos. 3 and 4 in which both magnetic removers were used. The clean edges not contaminated with flux particles and other foreign matters caused no subsequent cracking. The resultant crack-free flux-cored welding electrode wires realized satisfactory welding.

By comparison, tests Nos. 5 and 6 were conducted on the conventional wires prepared for the purpose of comparison without employing the magnetic removers of the fifth preferred embodiment. Of the cracks observed in both tests, those in test No. 6, in which flux $F_2$ containing iron powder was used, were more pronounced. The magnetic particles stirred up from the surface of the core materials under the influence of the magnetic field and adhered to the edges of the tube being formed caused cracking and the lowering of the product yield.

The Sixth Preferred Embodiment

The characteristic of the sixth preferred embodiment is that magnetic particles are magnetically drawn away from the surface of the core materials in the tube, and then the particles thus magnetically removed are further drawn away by vacuum suction, before the edges thereof are welded together.

Magnetic particles may be magnetically drawn either into a cylindrical member or to the periphery of a rotary member for further removal by vacuum suction.

The magnetic removal of magnetic particles is performed by the same method as employed in the fourth or fifth preferred embodiment. The vacuum suction of the magnetically removed particles is achieved by the use of a vacuum cleaner or other similar apparatus.

This preferred embodiment forms a magnetic field substantially equal to that built up at the welding spot at a suitable upstream point. The magnetic field thus formed draws such particles as might be attracted to the magnetized tube edges, particularly magnetic particles in the surface layer of the core materials. The particles thus magnetically drawn are further removed outside by vacuum suction. This

TABLE 12

| Test No. | Flux | Magnetic Removers | | Evaluation of Cracks | Classification |
|---|---|---|---|---|---|
| | | Remover 1 | Remover 2 | | |
| 1 | $F_1$ | Used ($l_1$ = 7 mm) | Not used | o | This invention |
| 2 | $F_2$ | Used ($l_1$ = 13 mm) | Not used | o | This invention |
| 3 | $F_3$ | Used ($l_1$ = 7 mm) | Used ($l_2$ = 5 mm) | o | This invention |
| 4 | $F_4$ | Used ($l_1$ = 13 mm) | Used ($l_2$ = 5 mm) | o | This invention |
| 5 | $F_5$ | Not used | Not used | x | Prior art compared |
| 6 | $F_6$ | Not used | Not used | x | Prior art compared |

[Note]
Evaluation of Cracks: Evaluated based on the incidence of cracks in 100 km of wire finished to a diameter of 1.2 mm. Wires having no crack was evaluated as good (o) and those having one or more cracks as poor (x).

eliminates the collection of the drawn magnetic particles at the magnetic remover and permits a continuous suction thereof. The resulting clean tube edges eliminate the risk of tube cracking that might occur when unwanted particles adhere thereto.

EXAMPLE

Figure 20:
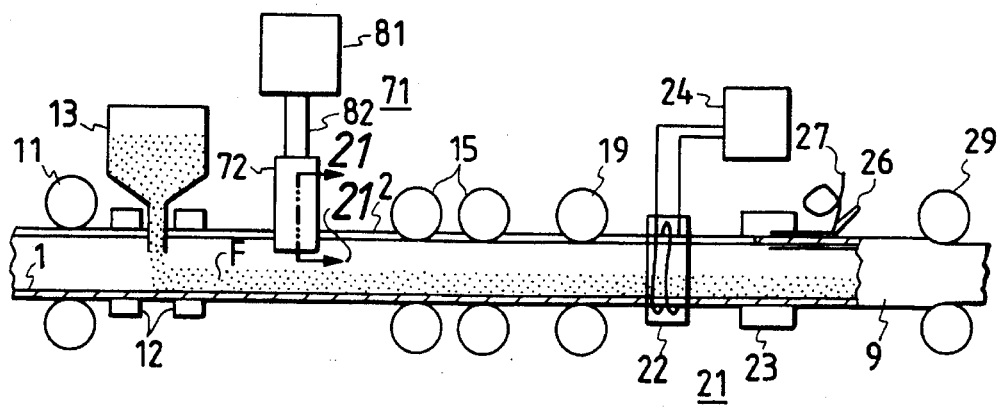
FIG. 20 shows another embodiment of apparatus for manufacturing cored tubes according to this invention or, more specifically, the principal part of an apparatus for manufacturing flux-cored welding electrode wires.

An example of the manufacture of flux-cored welding electrode wires is described below. FIG. 20 shows the principal part of an apparatus for manufacturing flux-cored welding electrode wires.

As is illustrated, this apparatus is essentially analogous to the one shown in FIG. 4. A device to draw (magnetically and by suction) magnetic particles from the surface layer $F_2$ of the flux F in the open tube 1 is disposed between a flux feeder 13 and a high-frequency induction welder 21.

Figure 21:
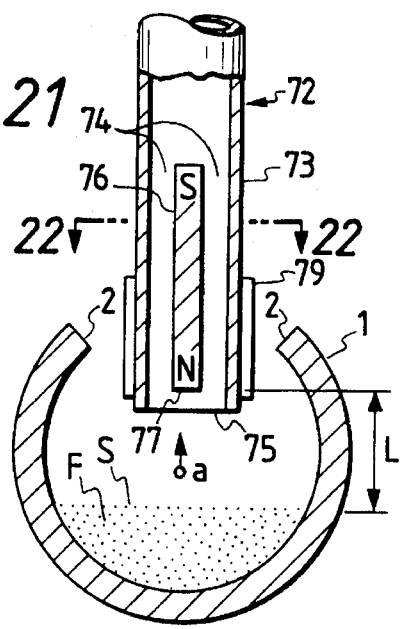
FIG. 21 is a cross-sectional view taken along the line 21—21 of FIG. 20.
Figure 22:
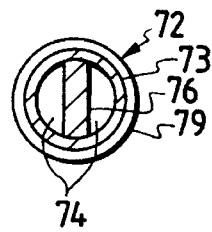
FIG. 22 is a cross-sectional view taken along the line 22—22 of FIG. 21.

This apparatus is described by reference to FIGS. 20, 21 (a cross section taken along the line 21—21 of FIG. 20), and 22 (a cross section taken along the line 22—22 of FIG. 21). A suction device 71 disposed just behind the flux feeder 13 comprises a magnetic suction tube 72 comprising a permanent magnet bar 76 contained in a cylinder 73 of nonmagnetic material (such as brass), a vacuum aspirator 81, and a flexible pipe 82 to connect the magnetic suction tube 72 to the vacuum aspirator 81. The magnetic suction tube 72 is inserted into the open tube 1 through the opening between the edges 2 thereof, with the open end 75 of the tube 72 facing downward. The permanent magnet bar 76 is diametrically disposed to leave clearances 74 on both sides thereof to allow the passage of the drawn magnetic particles, as shown in FIG. 22. One pole face 77 (the north pole) of the permanent magnet bar 76 faces the surface s of the core materials, with a clearance L left therebetween. The clearance L is adjusted so that the magnetic flux density at the surface s becomes large enough to attract magnetic particles from the surface layer $F_2$ of the flux F. A magnetic shielding steel tube 79 to prevent the magnetization of the tube edges 2 is fitted over the magnetic suction tube 72. Thus, the magnetic flux emitted from the pole face 77 covers the surface s and efficiently draws magnetic particles from the surface layer $F_2$ of the core materials. The magnetically drawn particles a ascend to the suction tube 72 along the line of magnetic flux. Then, the vacuum aspirator 81 draws the particles through the suction tube 72, clearances 74 and flexible pipe 82.

Figure 23:
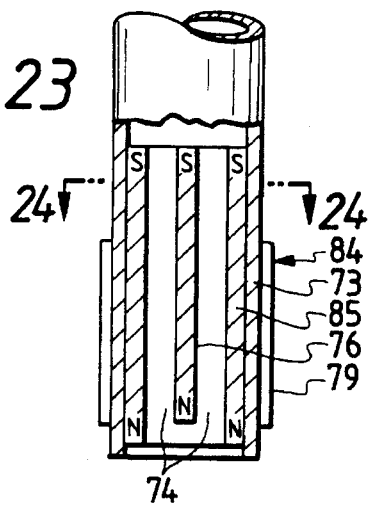
FIG. 23 is a cross-sectional view showing another embodiment of the magnetic attracting device.
Figure 24:
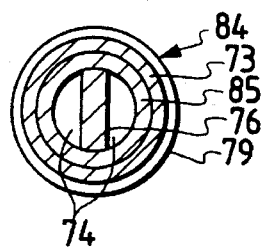
FIG. 24 is a cross-sectional view taken along the line 24—24 of FIG. 23.

FIGS. 23 and 24 (a cross section taken along the line 24—24 of FIG. 23) show another example of the magnetic suction tube. This magnetic suction tube 84 comprises a cylinder 73 of nonmagnetic material containing a tubular permanent magnet 85 and a permanent magnet bar 76 diametrically disposed therein leaving clearances 74 for the passage of the drawn magnetic particles on both sides thereof. Other details are analogous to those of the embodiment shown in FIG. 21.

Figure 25:
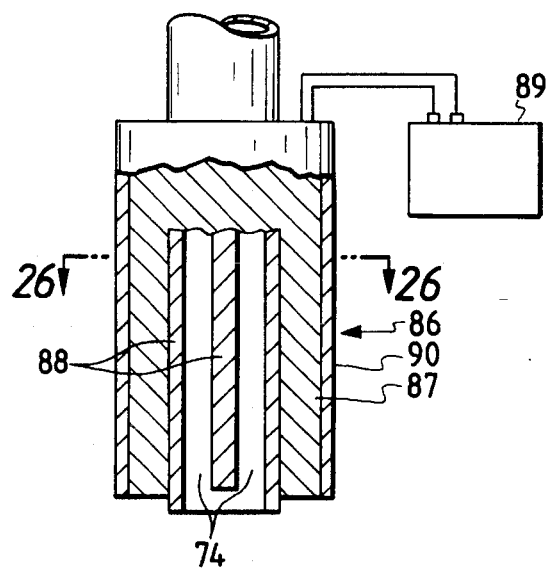
FIG. 25 is a cross-sectional view showing a still another embodiment of the magnetic attracting device.
Figure 26:
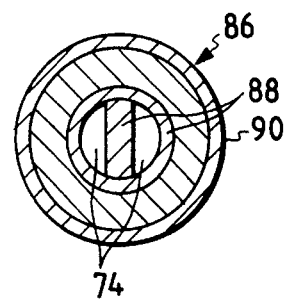
FIG. 26 is a cross-sectional view taken along the line 26—26 of FIG. 25.

FIGS. 25 and 26 (a cross section taken along the line 26—26 of FIG. 25) show a still another example of the magnetic suction tube. This magnetic suction tube 86 uses the solenoid 87 of an electromagnet. Iron cores 88 are disposed in the solenoid 87, with clearances 74 for the passage of the drawn particles left therein. A magnetic shielding tube 90 is fitted over the solenoid 87. An electric current passing from the direct-current power supply 89 to the solenoid 87 creates a magnetic field that attracts magnetic particles to the internal clearances 74.

The magnetic remover of this embodiment is not limited to the cylindrical one described above, but may be provided in other forms, such as:

(1) A disk-shaped rotary permanent magnet having a pole face on the periphery thereof, with the lower portion of the pole face (inside the open tube) magnetically attracting magnetic particles which are then removed by vacuum suction on the outside of the open tube when the same portion has travelled upward.

(2) A combination of the same disk-shaped permanent magnet as described above, a roller disposed outside the open tube and a belt (of cloth, resin or metal such as steel) passed thereover, with the portion of the belt running inside the open tube magnetically attracting magnetic particles which are then removed by vacuum suction when the same portion has travelled to between the disk-shaped permanent magnet and roller outside.

(3) A combination of two rollers and a magnet belt passed thereover like a caterpillar's endless belt, with the portion of the magnet belt running inside the open tube magnetically attracting magnetic particles which are then removed by vacuum suction when the same portion has travelled outside.

(4) A variation of the combination (3) comprising a third roller outside the open tube and a belt (of cloth, resin or metal such as steel) passed between the magnet belt and the third roller, with the portion of the belt covering the magnet belt while running inside the open tube magnetically attracting magnetic particles which are then removed by vacuum suction when the same portion leaves the magnet belt outside the open tube.

Details of these modifications are described below.

Figure 27:
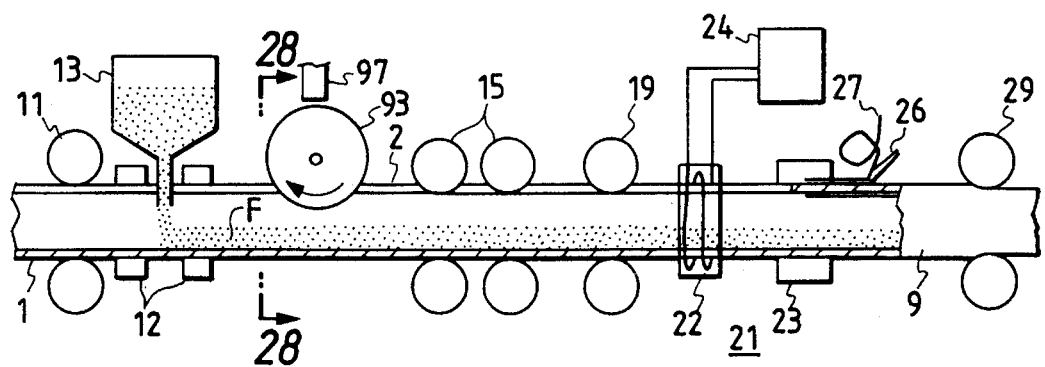
FIG. 27 shows another embodiment of apparatus for manufacturing cored tubes according to this invention or, more specifically, the principal part of an apparatus for manufacturing flux-cored welding electrode wires.
Figure 28:
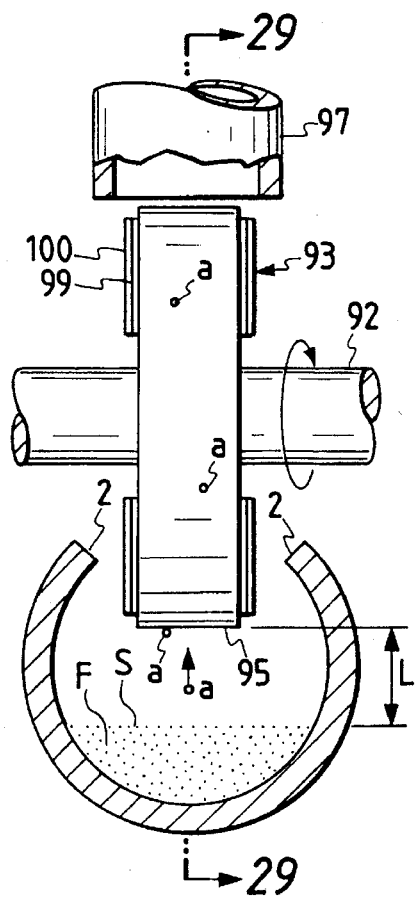
FIG. 28 is a cross-sectional view taken along the line 28—28 of FIG. 27.
Figure 29:
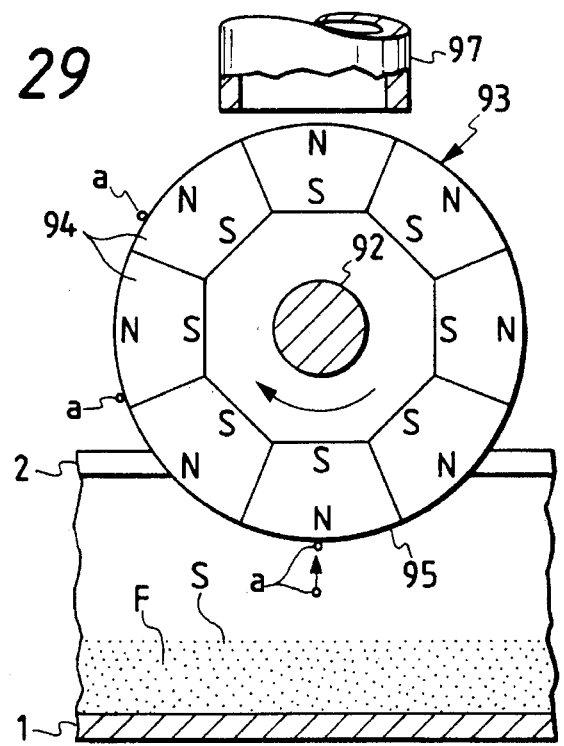
FIG. 29 is a cross-sectional view taken along the line 29—29 of FIG. 28.

An embodiment shown in FIGS. 27, 28 (a cross section taken along the line 28—28 of FIG. 27) and 29 (a cross section taken along the line 29—29 of FIG. 28) magnetically attracts magnetic particles with a disk-shaped permanent magnet 93 rotating about a shaft 92. The disk-shaped permanent magnet 93 comprises a ring of substantially rectangular small magnets 94, with the same pole face (the north pole) of all magnets directed outward. The lower portion of the disk-shaped permanent magnet 93 is inserted into the open tube 1 through the opening between the edge surfaces 2 thereof, with a given clearance L left between the periphery 95 thereof and the surface s of the core materials. The periphery 95 of the rotating disk-shaped permanent magnet 93 attracts magnetic particles a form the surface layer $F_2$ of the core materials. The suction port of a vacuum suction tube 97 facing the periphery 95 opens above the disk-shaped permanent magnet 93 to remove by vacuum suction the attracted magnetic particles a away from the periphery 95 turning upward. On both sides of the disk-shaped permanent magnet 93 are provided magnetic shielding steel plates 100, with sheets of nonmagnetic materials 99 interposed therebetween.

Figure 30:
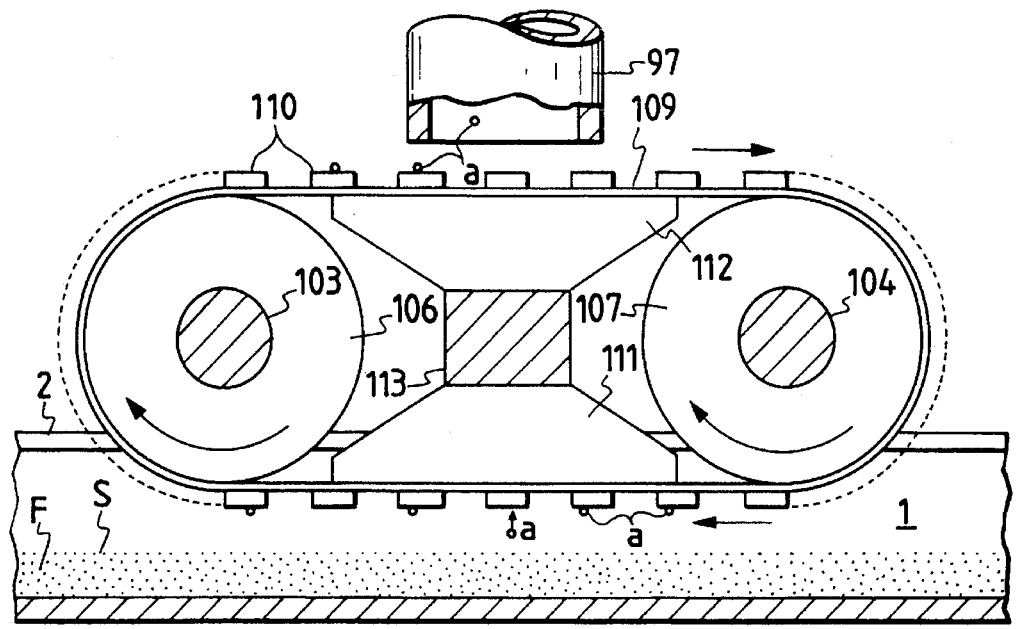
FIG. 30 shows another embodiment of the magnetic attracting device.

An embodiment shown in FIG. 30 attracts magnetic particles with a magnet belt 109 passed over a driving wheel 106 and a driven wheel 107 mounted on horizontal shafts 103 and 104 spaced away from each other along the length of the open tube 1. The magnet belt 109 resembles a caterpillar's endless belt comprising a series of small magnets 110 fastened to a belt of cloth, resin or metal. The lower portion of the magnet belt 109 is inserted into the open tube 1 through the opening between the edge surfaces 2 thereof, with a given clearance left between the pole face of the small magnets 110 and the surface s of the core materials. To retard the attenuation of magnetic flux density at the surface s, the small magnets 110 should preferably be attached to the belt 109 with the same pole faces directed in the same direction.

An upper steel plate 111 and a lower brass plate 112 held by a support 113 between the driving and driven wheels 106 and 107 prevent the slackening of the magnet belt 109. The small magnets 110 adhere to the bottom surface of the steel plate, while the magnet belt 109 slides over the top surface of the brass plate. While the magnet belt 109 revolves, the small magnets 110 thereon attract magnetic particles a from the surface layer $F_2$ of the core materials in the open tube. The suction port of a vacuum suction tube 97 facing the pole faces of the small magnets 110 opens above the magnet belt 109 to remove by vacuum suction the attracted magnetic particles a away from the small magnets 110 turning upward.

Figure 31:
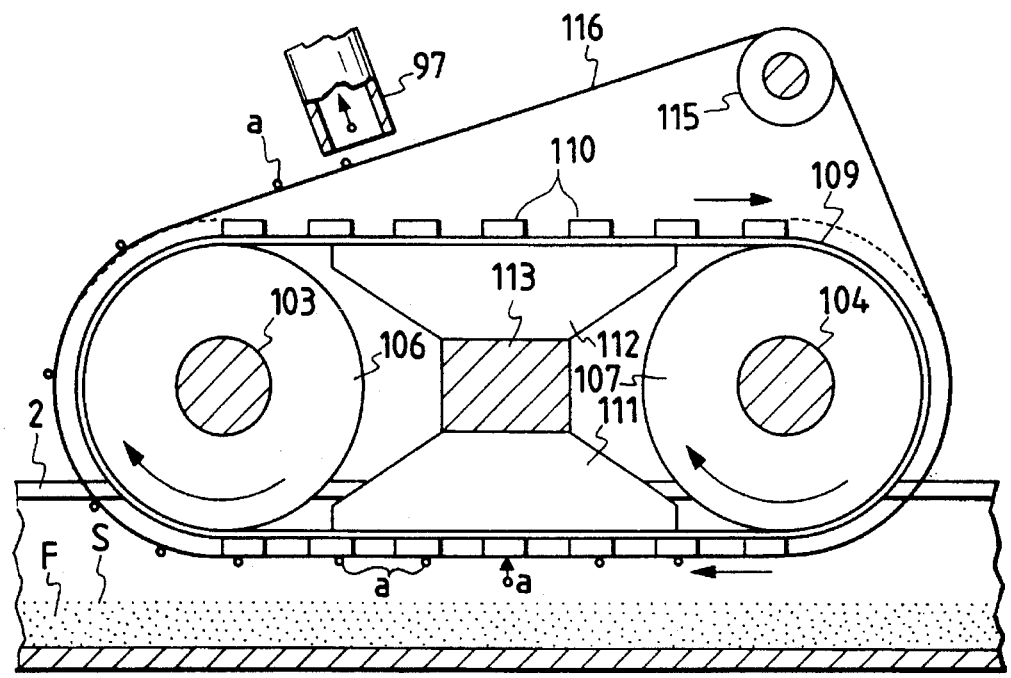
FIG. 31 shows still another embodiment of the magnetic attracting device.

An embodiment shown in FIG. 31 is a variation of the one shown in FIG. 30. A belt 116 (of cloth, resin or metal such as steel) is passed over the magnet belt 109 and an additional roller 115. The belt 116 covering the magnet belt 109 magnetically attracts magnetic particles a in the open tube. The vacuum suction tube 97 removes the attracted magnetic particles a from the belt 116 at the point where the belt 116 leaves the magnetic belt 109 outside the open tube.

The cracks occurred on the flux-cored welding electrode wires manufactured using the above apparatus are described below. The tube material, welding method, product sizes and other details are the same as in the fourth preferred embodiment.

While the magnetic particle removers shown in FIGS. 20 and 27 were employed, the fluxes used were the same as those shown in Table 9. They were prepared by mixing material powders. The mixtures were granulated by the addition of a binder (water glass), dried and classified.

TABLE 13

| Test No. | Used or Not | Type of Magnetic Attraction | Evaluation of Cracks | Classification |
|---|---|---|---|---|
| 1 | Used | Apparatus shown in FIG. 20 Magnetic flux density at pole surface: 2000 gausses Clearance: L = 7 mm | o | This invention |
| 2 | Used | Apparatus shown in FIG. 27 Magnetic flux density at pole surface: 1600 gausses Clearance: L = 12 mm | o | This invention |
| 3 | Not used | — | x | Prior art compared |

[Note]
Evaluation of Cracks: Evaluated based on the incidence of cracks in 100 km of wire finished to a diameter of 1.2 mm. Wires having no crack was evaluated as good (o) and those having one or more cracks as poor (x).

The evaluation of cracks was made in the same manner as in the first preferred embodiment.

Tests Nos. 1 and 2 in Table 13 were made on the flux-cored welding electrode wires of this invention prepared by the use of the magnetic particle removers described before. The resultant crack-free flux-cored welding electrode wires realized satisfactory welding.

By comparison, test No. 3 was conducted on the conventional wire prepared for the purpose of comparison without employing the magnetic removers. The magnetic particles stirred up from the surface of the core materials under the influence of the magnetic field and attracted to the edges of the tube being formed caused cracking and the lowering of the product yield.

The Seventh Preferred Embodiment

The characteristic of the seventh preferred embodiment is that the tubes to be butt-welded have a wall thickness of not more than 5 mm, an outside diameter of not more than 50 mm and edges forming a groove flaring upward and downward from the center of the wall thickness. Grooves of this type are the X, H, K and double-J grooves.

At least one of the two edges may be reduced by the fins on finned rolls to form a profile flaring upward and downward from the center of the wall thickness. The edges shaped into a profile to form an X or other similar groove by means of the fins on finned rolls are butt-welded.

Let P, O, I and M respectively denote the vertex of the end seam profile, the outer extreme point, the inner extreme point, and the midpoint of a line segment OI. Preferably, then, both edges of the open tube should be joined together to form an angled shape satisfying the following relationships between distances $L_{PM}$ and $L_{OI}$ and the wall thickness t:

$L_{PM}/t = 0.5$ to $7.0$ $L_{OI}/L_{PM} \leq 1.0$ where
$L_{PM}$=Distance between P and M along the axis of the tube
$L_{OI}$=Distance between O and I along the axis of the tube
To keep $L_{PM}/t$ between the above limits, it is also preferable to keep the convergent angle θ of the opening V between 3 and 15 degrees.

Figure 32:
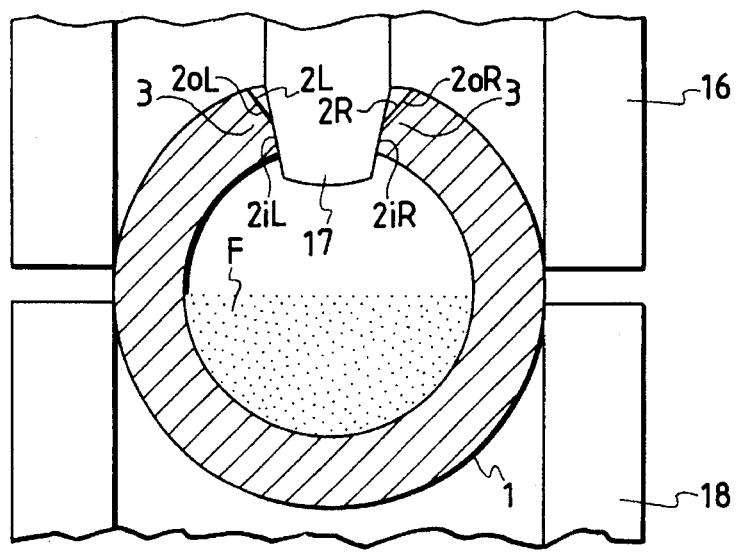
FIG. 32 shows a fin on a fin-roll that conditions the edges of an almost closed tube.

In this preferred embodiment, the X and other grooves flaring upward and downward from the center of the wall thickness are formed by machining or plastic working. Because of the wall thickness not larger than 5 mm and the outside diameter not larger than 50 mm, however, machining and plastic working are considerably difficult. Here, the same object can be achieved more economically and efficiently by rolling at least one of the two meeting edges into the desired shape to form an X or other groove with the fins on finned rolls. Here, the finned rolls are the fin-pass, seam-guide and other finned rolls disposed between the core material feeder and butt-welder. The fins of the finned rolls shape at least one of the meeting edge surfaces of the open tube into an angled surface. FIG. 32 shows how this edge rolling is carried out. A tube 1 containing core material F and held between a finned-roll 16 and a support roll 18 runs toward the following squeeze rolls. The fin 17 on the finned roll 16 is inserted into the opening in the tube 1 to change the shape of both edge surfaces 2L and 2R thereof. The fin changes the shape of either the upper or lower part, or both, of the edge surfaces 2L and 2R. In the illustrated example, the sides of the fin 17 pressed against the lower part change the flat edge surfaces 2L and 2R into angled surfaces. The reshaped edge surfaces 2L and 2R have inner inclined planes 2iL and 2iR and outer inclined planes 2oL and 2oR. The edges thus forming an X groove are butt-welded, with the projecting points thereof at the center of the wall thickness coming into contact with each other.

The magnetic particles stirred up from the surface layer of the core materials by the magnetic field created by high-frequency welding adhere to the edge surfaces 2. Preferably the adhered magnetic particles should be removed from the edge surfaces 2 as much as possible as they can cause weld defects and tube cracking. This preferred embodiment solves this problem by shaping both edges 3 of the tube 1 into X or other grooves having two inclined planes 2o and 2i (see FIG. 35).

Figure 33:
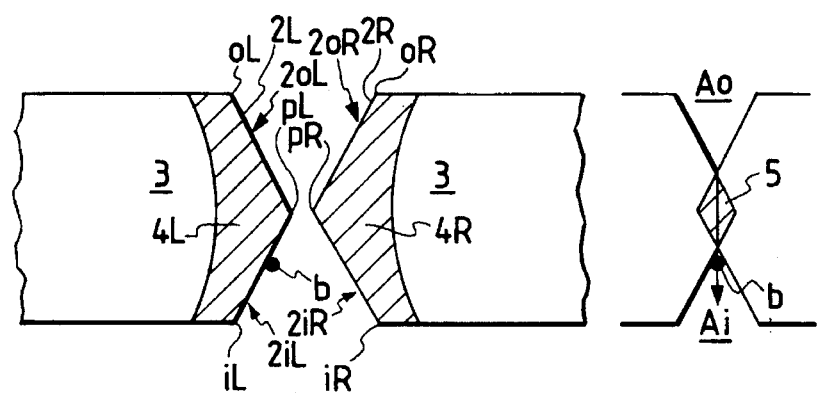
FIG. 33 shows the particles of a powdery or granular core material removed from the edges of an almost closed tube.

Referring now to FIG. 33, the mechanism by which the magnetic particles attracted to the magnetized edges planes 2 are removed is described below.

(a) The hatched areas 4L and 4R in FIG. 33 denote those zones of the edges 3L and 3R which are affected by the Joule heat generated by a high-frequency electric current. The paired squeeze rolls at the welding spot press both edge surfaces 2L and 2R closer to each other until they come into contact to create a condition of pressure welding. First, the protruding points pL and pR of the two edge surfaces 2L and 2R come in contact with each other. Then, the edges between the inner inclined planes 2iL and 2jR and outer inclined planes 2oL and 2oR, and eventually the inner extreme points iL and iR and outer extreme points oL and oR, are pressed together.

(b) When the edges between the inner inclined planes 2iL and 2jR and outer inclined planes 2oL and 2oR are pressed together, the heat affected zones 5 in the hatched areas in FIG. 33 move toward the upper and lower spaces $A_o$ and $A_i$ to cause the metal to overflow or rise. The rising metal flow exerts a force indicated by the arrow on the edge surfaces 2 or, in the case of the illustrated example, on the magnetic particles b attracted to the inner inclined plane 2iL, to completely eject them out of the welded joint.

This rising metal flow is induced by the flow of a high-frequency electric current in the substantially triangular heat affected zones 4L and 4R. This permits minimizing the areas to be heated by a high-frequency current which, in turn, permits saving the supply of the welding current or heat input and assuring highly efficient welding operations.

Figure 34:
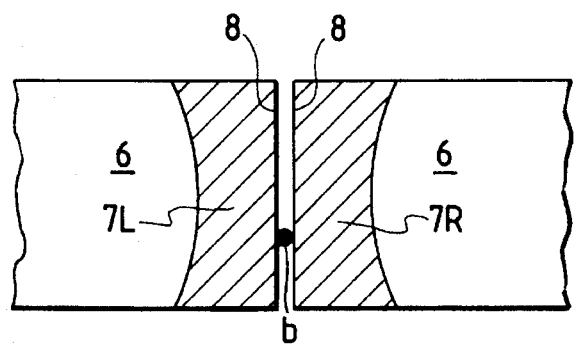
FIG. 34 shows a conventional (I-shaped) groove formed between the butted edges of an almost closed tube.

FIG. 34 shows a conventional I-shaped groove formed by two parallel edge surfaces. The hatched areas 7L and 7R in FIG. 34 denote those zones of the edges 6L and 6R which are affected by the heat generated by a high-frequency electric current. Because all points of both edge surfaces 8L and 8R come into contact substantially simultaneously to start pressure welding, the magnetically attracted particles b between the edge surfaces 8L and 8R are entrapped in the welded metal, having no place to escape. The subsequent rising metal flow in the heat-affected zones 7L and 7R causes the magnetic particles b to move both inside and outside the tube. Depending on their initial position on the edge surfaces, however, the magnetically attracted particles b remain unejected, either inside or outside. This tendency is more pronounced with the particles b magnetically attracted to the center of the wall thickness. Simple application of additional upsetting by squeeze rolls does not provide a satisfactory solution. This necessitates larger heat-affected zones, greater heat input and increased power consumption. The increased heat input promotes spattering and increases the risk of introducing more unwanted metal particles inside. The increased upsetting forms more beads on the inside and outside of the welded edges, causing an increased consumption of the tube metal. Like the spatters, the excess beads building up on the inside of the welded seams can also induce breaking in the subsequent diameter-reduction process. These disadvantages have restricted the applicable limit of additional upsetting and, as a consequence, made difficult the complete elimination of the magnetically attracted particles b from between the conventional edge surfaces.

The profile of a seam end as used in this invention means a profile drawn by the defining lines at the closing end of a seam formed by joining together the edge surfaces 2 of the tube by high-frequency welding. As shown in FIG. 35, each edge surface 2 of the tube in this preferred embodiment has two inclined planes, i.e., an outer inclined plane 2o and an inner inclined plane 2i. The lines 126 defining the closing end of a seam 125 have a vertex P, an outer extreme point O, an inner extreme point I, and a midpoint M of a line segment OI. Then, the profile of the seam end is shaped so that the axial distances $L_{PM}$ and $L_{OI}$ and the wall thickness t satisfy the relationships $L_{PM}/t=$ 0.5 to 7.0 and $L_{OI}/L_{PM} \leq 1.0$. If $L_{PM}/t<0.5$, then the elimination of magnetic particles from between the edge surfaces is inadequate. If $L_{PM}/t>7.0$, then the applied high-frequency current concentrates to the vicinity of the vertex, causing much spattering and unsatisfactory welding. If $L_{OI}/L_{PM}>1.0$, then the upsetting on the inside and outside of both edges become too uneven to assure satisfactory welding.

The angular profile of the seam end (hatched by heavy lines) is defined by lines 126i and 126o respectively inclining inward and outward from the center of the edge surface. Here, each edge 3 has an angular cross section (perpendicular to the tube axis) as shown in a dotted frame 128 in FIG. 35. When joined together, both edges 3L and 3R form an X groove as shown in FIG. 33. The vertex p, outer extreme point o, inner extreme point i and midpoint m of a line segment oi of the angular edge 3 shown in the dotted frame 128 correspond to the vertex P, outer extreme point O, inner extreme point I and midpoint M of the line segment OI of the seam end. The two facing edge surfaces do not simultaneously come into contact with each other at all points thereof, but at the center of the wall thickness first. Accordingly, the points P, O and I on the lines 126 correspond to the points p, o and i of different edge cross sections. The groove height H (which is the axial distance between the vertex p and midpoint m) corresponds to the distance $L_{PM}$ on the defining lines.

FIGS. 36(a–36(d) show concrete examples of the angular profiles of seam ends.

FIG. 36(a) $L_{PM}/t=2.7$ and $L_{OI}/L_{PM}=0$

FIG. 36(b) $L_{PM}/t=2.6$ and $L_{OI}/L_{PM}=0.8$ (V-shaped)

FIG. 36(c) $L_{PM}/t=3.9$ and $L_{OI}/L_{PM}=0.8$ (Inverted V-shaped)

FIG. 36(d) $L_{PM}/t=0.6$ and $L_{OI}/L_{PM}=0$

FIG. 37 is a top view of tubes at the welding spot, whereas FIGS. 38(a) and (b) are cross sections taken along the lines 38a—38a and 38b—38b of FIG. 37, all showing the profile of a seam end with $L_{OI}/L_{PM}=0$ for the sake of simplicity. The relationship between the angle between both edge surfaces 2L and 2R or the convergent angle θ of the opening V at the welding spot, groove height H and axial distance $L_{PM}$ between P and M is theoretically expressed as follows, as is obvious from the hatched right triangle in FIG. 37:

$$[L_{PM}]=H \cdot (\sin \theta/2)^{-1}$$

$$\therefore [L_{PM}/t]=(H/t) \cdot (\sin \theta/2)^{-1}$$

([ ] indicates the theoretical value.)

The following relation has empirically been found to hold between the observed value $L_{PM}/t$ and theoretical value $[L_{PM}/t]$:

$$L_{PM}/t=\alpha \cdot [L_{PM}/t]$$

Coefficient a is approximately between 1 and 5, varying with tubing conditions (such as tube sizes, i.e., wall thickness and tube diameter, squeeze allowance, heat input and welding speed). FIG. 39 plots $[L_{PM}/t]–\theta$ curves based on the above theoretical equation. When the convergent angle θ is fixed, [$L_{PM}/t$] increases with increasing H/t. On the other hand, [$L_{PM}/t$] gradually decreases with increasing convergent angle θ. Accordingly, the theoretical value [$L_{PM}/t$] or observed value $L_{PM}/t$ can be held within an appropriate range by decreasing the convergent angle θ when H/t is small or the groove edges are close to parallel and by increasing the convergent angle θ when H/t is large or the vertical angle between both edges surfaces is close to 90 degrees. That is, the observed value $L_{PM}/t$ can be adjusted by controlling the variable convergent angle θ. To form satisfactory welds, the convergent angle θ should preferably be kept between 3 and 15 degrees.

To obtain an angled seam end profile satisfying the relationships $L_{PM}/t=0.5$ to 7.0 and $L_{OI}/L_{PM} \leq 1$, tube forming should be carried out according to an empirically predetermined tubing schedule. The forming schedule is determined by adjusting the following factors:

(1) The amount of strip edges bending by the preforming rolls.

(2) The amount of forming by the sets of forming rolls.

(3) The amount of open tube edge reforming by the fin rolls.

(4) The amount of upsetting by the squeeze rolls.

(5) The clearance between the seam-guide and squeeze rolls.

(6) The width of the fins on the seam-guide rolls.

The convergent angle θ of the opening V is set by mainly adjusting (5) and (6).

The seam end profile is judged by an expansion test which is conducted as described below. After stopping welding, a specimen of a suitable length (such as two to five times the outside diameter of the tube) extending over both open (unwelded) and welded portions is taken at the welding spot just after the squeeze rolls). The unwelded end of the specimen is flared by pressing against a conical tool having a vertical angle of 60 degrees with a force of approximately 10 tons. The seam end profile is judged by checking the resulting fractured surface on the specimen.

This preferred embodiment shapes at least one of the two edges of the open tube into an angled surface to carry out butt-welding with X or other similar grooves. This edge forming is continuously performed in line by means of the fins on the fin rolls, without necessitating any additional device.

Butt-welding with the X and other grooves formed by the angled edge surfaces facilitates the self-edge-cleaning action described before.

EXAMPLE

An example of the manufacture of flux-cored welding electrode wires is described below. FIG. 40 shows the principal part of an apparatus for manufacturing flux-cored welding electrode wires.

As is illustrated, this apparatus is essentially analogous to the one shown in FIG. 4, except that only one flux feeder 13 is used. The open tube 1 filled with the fluxes F1 and F2 passes through the fin-pass rolls 15 and seam-guide rolls 19 into the welding zone. A high-frequency welder 21 comprises a work coil 22 and squeeze rolls 23. A power supply 24 supplies a high-frequency welding current to the work coil 22. The welded tube is rolled through rolling rolls 29, and then, while being annealed, further reduced to a finished product with an outside diameter of 1.0 to 2.0 mm through rolling and drawing lines (both not shown).

This high-frequency welding creates a magnetic field in the open tube 1 which stirs up and attracts magnetic particles to the tube edges 2 from the surface layer of the core materials F. Preferably the adhered magnetic particles should be removed from the edge surfaces 2 as much as possible as they can cause weld defects and tube cracking. This preferred embodiment solves this problem by shaping both edges surfaces 2 of the tube into angled surfaces with the fins of the fin rolls. In the flux-cored wire manufacturing line shown in FIG. 40, the sides of the fins 17 on the fin rolls 16 pressed against the upper or lower part, or both, of the edge surfaces 2 (2L and 2R) change the edge surfaces 2 from flat surfaces to angled ones, which are subsequently pressed together by the squeeze rolls 23 to form an X groove for butt-welding (see FIG. 32). A pronounced flow of metal from the center of the wall thickness to both sides thereof that occurs in this squeeze pressing process almost completely carries the particles magnetically attracted to the tube edges out of the welded seam.

The cracks occurred on the flux-cored welding electrode wires manufactured on the above apparatus are described below. The tube material, welding method, product sizes and other details are the same as in the fourth preferred embodiment.

The seam end profiles tested were obtained by forming tubes according to the forming schedules empirically predetermined as described before. The tests were conducted on the tubes whose seams were butt-welded after shaping the facing edges of the material open tubes into angled surfaces to form an X groove with the fins on the fin rolls. The value of $L_{PM}/t$ was determined by adjusting the convergent angle θ of the opening V between 5 and 10 degrees.

The heat input P ($=E_p I_p$) for high-frequency welding was between 130 and 150 kVA in tests Nos. 1 to 10 (on the products according to this preferred embodiment) and 165 kVA in tests Nos. 11 to 13 (on the conventional products tested for comparison).

The fluxes used were the same as those shown in Table 9.

TABLE 14

| Test No. | Groove Profile | Profile of Seam End | | Evaluation of Cracks | Classification |
|---|---|---|---|---|---|
| | | $L_{PM}/t$ | $L_{OI}/L_{PM}$ | | |
| 1 | X | 0.6 | 0 | o | This invention (FIG. 36 (d)) |
| 2 | X | 1.5 | 0.1 | o | This invention (FIG. 36 (d)) |
| 3 | X | 2.7 | 0 | o | This invention (FIG. 36 (a)) |
| 4 | X | 3.9 | 0.8 | o | This invention (FIG. 36 (c)) |
| 5 | X | 2.2 | 0 | o | This invention (FIG. 36 (c)) |
| 6 | X | 3.1 | 0.2 | o | This invention (FIG. 36 (c)) |
| 7 | X | 4.1 | 0.1 | o | This invention (FIG. 36 (c)) |
| 8 | X | 5.3 | 0.1 | o | This invention (FIG. 36 (c)) |
| 9 | X | 6.1 | 0.5 | o | This invention (FIG. 36 (c)) |
| 10 | X | 6.5 | 0.3 | o | This invention (FIG. 36 (c)) |
| 11 | X | 0.3 | 0 | x | Prior art compared |
| 12 | X | 8.7 | 0.7 | x | Prior art compared |
| 13 | I | — | — | x | Prior art compared |

[Note]
Evaluation of Cracks: Evaluated based on the incidence of cracks in 100 km of wire finished to a diameter of 1.2 mm. Wires having no crack was evaluated as good (o) and those having one or more cracks as poor (x).

The evaluation of cracks was made in the same manner as in the first preferred embodiment.

Tests Nos. 1 to 10 in Table 14 were made on the flux-cored welding electrode wires of this invention prepared with the seam end profiles specified above. The resultant crack-free good-quality flux-cored welding electrode wires realized satisfactory welding.

By comparison, tests Nos. 11 to 13 were conducted on the conventional wires with seam end profiles deviating from those according to this invention which were prepared for the purpose of comparison. While $L_{PM}/t$ in test No. 11 was lower than the lower limit (0.5) of the range specified before, that in test No. 12 exceeded the upper limit (7.0). The groove in test No. 13 was I-shaped. In these comparison tests, the magnetic particles stirred by the magnetic field adhered to the edges of the open tube, thereby causing tube cracking and the lowering of the product yield.

This preferred embodiment butt-welds seams with grooves flaring upward and downward from the center of the wall thickness (such as the X groove). Such grooves are formed by the edge surfaces angled under the pressure applied by the fins on the fin rolls. The groove butt-welding is performed in such a way to form specific angled seam end profiles. Accordingly, this preferred embodiment has the following advantages:

The resulting flow of heat metal substantially completely ejects the unwanted particles magnetically attracted to the tube edges out of welded seams. The self-cleaning function of this preferred embodiment expels the magnetically adhered particles (or contaminants) from the tube edges to both outside and inside the tube being welded.

The metal flow occurring in the heat-affected zone in the angled edges of the tube being welded permits minimizing heating with a high-frequency electric current, which, in turn, saves high-frequency welding current or heat input and permits highly efficient welding.

Continuous in-line shaping of the edge surfaces into angled surfaces eliminates the need for extra shaping process or apparatus.

Forming of the X or other grooves immediately before the work roll facilitates groove profile adjustment and other working.

Freed of cracking induced by the unwanted particles magnetically attracted to the edges to be welded together, the good-quality flux-cored welding electrode wires according to this preferred embodiment assure satisfactory welding while enhancing the product yield.

What is claimed is:

1. A method for manufacturing tubes filled with powdery and/or granular substances comprising the steps of:
    forming a metal strip into a tube;
    feeding powdery and/or granular substances into the tube being formed as a core, with powdery and/or granular substance having a low enough magnetic susceptibility $X_g$ to remain unattracted to the edges of the tube forming at least the top layer of the core, the magnetic susceptibility being determined on the basis of the welding heat input;
    joining together the edges of the tube filled with the core of the powdery and/or granular substances by high-frequency welding; and
    reducing the diameter of the welded tube filled with the core of the powdery and/or granular substances.

2. A method for manufacturing tubes filled with powdery and/or granular substances according to claim 1, wherein the magnetic susceptibility $X_g$ is expressed as:

$$X_g \leq (2.00 + 246 P^{-0.89}) \cdot 10^{-4} \text{ [emu/g]}$$

where P=Welding heat input [kVA].

3. A method for manufacturing tubes filled with powdery and/or granular substances according to claim 1, wherein pregranulated substances having a particle size $d \geq 0.02 P^{0.6}$ [mm] are fed into the tube being formed.

4. A method for manufacturing tubes filled with powdery and/or granular substances according to claim 1, wherein the magnetic susceptibility and particle mass of the powdery and/or granular substances to remain unattracted to the magnetized tube edges are determined on the basis of the welding heat input, at least the top layer of the core in the tube is composed of the powdery and/or granular substances having the magnetic susceptibility $X_g$ and particle mass m thus determined, and a given clearance L is left between the top surface of the core and the seam to be welded.

5. A method for manufacturing tubes filled with powdery and/or granular substances according to claim 4, wherein the magnetic susceptibility $X_g$ is expressed as:

$$X_g \leq (2.00 + 246 P^{-0.89}) \cdot 10^{-4} \text{ [emu/g]}$$

where P=Welding heat input [kVA]; the particle mass m is expressed as:

$$m \leq 1.8 \times 10^{-5} \cdot P^{1.8} \text{ [mg]};$$

and the clearance L is expressed as:

$$L \leq 5 \text{ [mm]}.$$

6. A method for manufacturing tubes filled with powdery and/or granular substances comprising the steps of:
    forming a metal strip into a tube;
    feeding powdery and/or granular substances into the tube being formed as a core, the powdery and/or granular substances consisting of ferromagnetic and paramagnetic substances mixed to a basic formulation, with a first portion consisting of the ferromagnetic and paramagnetic substances of the basic formulation forming the bottom layer of the core and a second portion consisting of only the paramagnetic substances of the basic formulation forming the top layer of the core;
    joining together the edges of the tube filled with the core of the powdery and/or granular substances by high-frequency welding; and
    reducing the diameter of the welded tube filled with the core of the powdery and/or granular substances.

7. A method for manufacturing tubes filled with powdery and/or granular substances according to claim 6, wherein the paramagnetic substances in the first and second portions are mixed in the same proportions as in the basic formulation.

8. A method for manufacturing tubes filled with powdery and/or granular substances comprising the steps of:
    forming a metal strip into a tube;
    feeding powdery and/or granular substances into the tube being formed as a core;
    joining together the edges of the tube filled with the core of the powdery and/or granular substances by high-frequency welding;
    reducing the diameter of the welded tube filled with the core of the powdery and/or granular substances; and
    removing magnetic particles contained in the core in the tube by magnetic attraction before the edges of the tube are welded together.

9. A method for manufacturing tubes filled with powdery and/or granular substances according to claim 8, wherein magnetic particles are removed by magnetic attraction before the powdery and/or granular substances are fed into the tube.

10. A method for manufacturing tubes filled with powdery and/or granular substances according to claim 8, wherein magnetic particles are removed by magnetic attraction after the powdery and/or granular substances have been fed into the tube.

11. A method for manufacturing tubes filled with powdery and/or granular substances according to claim 8, wherein magnetic particles are removed by magnetic attraction before and after the feed of the powdery and/or granular substances into the tube.

12. A method for manufacturing tubes filled with powdery and/or granular substances according to claim 8, wherein magnetic particles are removed by magnetic attraction from the edges of the tube and the vicinity thereof.

13. A method for manufacturing tubes filled with powdery and/or granular substances according to claim 8, wherein the magnetic particles removed by magnetic attraction are further removed by vacuum suction.

14. A method for manufacturing tubes filled with powdery and/or granular substances according to claim 13, wherein magnetic particles are magnetically drawn into a cylinder for subsequent removal by vacuum suction.

15. A method for manufacturing tubes filled with powdery and/or granular substances according to claim 13, wherein magnetic particles are magnetically drawn to the periphery of a rotary member for subsequent removal by vacuum suction.

16. A method for manufacturing tubes filled with powdery and/or granular substances comprising the steps of:

forming a metal strip into a tube;

feeding powdery and/or granular substances into the tube being formed as a core;

joining together the edges of the tube filled with the core of the powdery and/or granular substances by high-frequency butt-welding, the butt-welding being performed on the edges of the tube having a wall thickness of not more than 5 mm and an outside diameter of not more than 50 mm, the edges forming a groove flaring upward and downward from the center of the wall thickness; and reducing the diameter of the welded tube filled with the core of the powdery and/or granular substances.

17. A method for manufacturing tubes filled with powdery and/or granular substances according to claim 16, wherein at least one of the edges is reduced by the fin of a fin roll to form a groove flaring upward and downward from the center of the wall thickness.

18. A method for manufacturing tubes filled with powdery and/or granular substances according to claim 16, wherein an angled seam end profile satisfying the following relationships between distances $L_{PM}$ and $L_{OI}$ and wall thickness t when P, O, I and M respectively denote the vertex that meets the corresponding point on the opposite edge, the outer extreme point, the inner extreme point, and the midpoint of a line segment OI:

$$L_{PM}/t = 0.5 \text{ to } 7.0$$

$$L_{OI}/L_{PM} \leq 1.0$$

where $L_{PM}$=Distance between P and M along the axis of the tube $L_{OI}$=Distance between O and I along the axis of the tube.

19. A method for manufacturing tubes filled with powdery and/or granular substances according to claim 18, wherein $L_{PM}/t$ of the desired value is obtained by adjusting the convergent angle θ of the opening V is adjusted between 3 and 15 degrees.

* * * * *